US012122979B2

(12) United States Patent
Lynch et al.

(10) Patent No.: US 12,122,979 B2
(45) Date of Patent: *Oct. 22, 2024

(54) CLEANING ARTICLE WITH PREFERENTIAL RHEOLOGICAL SOLID COMPOSITION

(71) Applicant: The Procter & Gamble Company, Cincinnati, OH (US)

(72) Inventors: Matthew Lawrence Lynch, Mariemont, OH (US); Scott Kendyl Stanley, Mason, OH (US); Brandon Philip Illie, Felicity, OH (US); Taotao Zhu, West Chester, OH (US); Jamie Lynn Dria, Deerfield Township, OH (US)

(73) Assignee: The Procter & Gamble Company, Cincinnati, OH (US)

(*) Notice: Subject to any disclaimer, the term of this patent is extended or adjusted under 35 U.S.C. 154(b) by 192 days.

This patent is subject to a terminal disclaimer.

(21) Appl. No.: 17/485,906

(22) Filed: Sep. 27, 2021

(65) Prior Publication Data

US 2022/0010245 A1 Jan. 13, 2022

Related U.S. Application Data

(63) Continuation-in-part of application No. 17/225,150, filed on Apr. 8, 2021, now abandoned.

(60) Provisional application No. 63/007,968, filed on Apr. 10, 2020.

(51) Int. Cl.

| | |
|---|---|
| ***C11D 17/00*** | (2006.01) |
| ***A47L 13/17*** | (2006.01) |
| ***C11D 1/04*** | (2006.01) |
| ***C11D 7/26*** | (2006.01) |
| ***C11D 17/04*** | (2006.01) |
| ***C11D 17/06*** | (2006.01) |

(52) U.S. Cl.

CPC .............. *C11D 17/04* (2013.01); *C11D 7/265* (2013.01)

(58) Field of Classification Search

None

See application file for complete search history.

(56) References Cited

U.S. PATENT DOCUMENTS 823,725 A 6/1906 Hayden
3,293,684 A * 12/1966 Tundermann ............ A47K 7/03 510/142
3,956,158 A 5/1976 Donaldson
4,107,289 A 8/1978 Kaufman
4,203,857 A * 5/1980 Dugan .................... A47L 13/17 510/438
4,322,400 A 3/1982 Yuhas
4,486,404 A 12/1984 Weinert
4,806,340 A 2/1989 Gaffar
4,808,467 A 2/1989 Suskind et al.
5,144,729 A 9/1992 Austin et al.
5,160,739 A 11/1992 Kanga
5,340,492 A 8/1994 Kacher et al.
5,340,571 A 8/1994 Grace
5,425,892 A 6/1995 Taneri et al.
5,436,278 A 7/1995 Imashiro et al.
5,525,397 A 6/1996 Shizuno et al.
5,585,092 A 12/1996 Trandai et al.
5,605,681 A 2/1997 Trandai et al.
5,691,035 A 11/1997 Chappell et al.
5,846,520 A 12/1998 Guskey et al.
5,916,590 A 6/1999 Cody et al.
6,042,815 A 3/2000 Kellner et al.
6,143,393 A 11/2000 Abe et al.
6,241,835 B1 6/2001 Abe et al.
6,245,413 B1 6/2001 Kenmochi et al.
6,329,308 B1 12/2001 Kenmochi et al.
6,550,092 B1 4/2003 Brown et al.
6,554,937 B1 4/2003 Kenmochi et al.
6,774,070 B1 8/2004 Kenmochi et al.
6,777,064 B1 8/2004 Brown et al.
6,797,357 B2 9/2004 Fereshtehkhou et al.
6,813,801 B2 11/2004 Tanaka et al.
6,936,330 B2 8/2005 Fereshtehkhou et al.
7,003,856 B2 2/2006 Hayashi et al.
7,041,277 B2 5/2006 Holme
7,291,359 B2 11/2007 Haskett et al.
7,386,907 B2 6/2008 Otsuka et al.
7,560,398 B2 7/2009 Zillig et al.
7,566,671 B2 7/2009 Hoadley et al.
7,712,178 B2 5/2010 Yamada
7,779,502 B2 8/2010 Fujiwara et al.
7,937,797 B2 5/2011 Tsuchiya et al.

(Continued)

FOREIGN PATENT DOCUMENTS

CA 680113 A 2/1964
CN 107440935 A 12/2017

(Continued)

OTHER PUBLICATIONS

PCT Search Report and Written Opinion for PCT/US2021/026300 dated Jul. 20, 2021.
All Office Actions; U.S. Appl. No. 17/196,379, filed Mar. 9, 2021.
All Office Actions; U.S. Appl. No. 17/225,146, filed Apr. 8, 2021.
All Office Actions; U.S. Appl. No. 17/225,147, filed Apr. 8, 2021.
All Office Actions; U.S. Appl. No. 17/225,148, filed Apr. 8, 2021.
All Office Actions; U.S. Appl. No. 17/225,149, filed Apr. 8, 2021.
All Office Actions; U.S. Appl. No. 17/225,150, filed Apr. 8, 2021.
All Office Actions; U.S. Appl. No. 17/225,151, filed Apr. 8, 2021.
All Office Actions; U.S. Appl. No. 17/225,153, filed Apr. 8, 2021.
All Office Actions; U.S. Appl. No. 17/225,176, filed Apr. 8, 2021.
All Office Actions; U.S. Appl. No. 17/225,218, filed Apr. 8, 2021.
Clinton D. Stevenson, et al. ,"Capillary Pressure as Related to Water Holding in Polyacrylamide and Chicken Protein Gels", Journal of Food Science, vol. 78, Nr. 2, dated 2013,pp. C145-C151.

(Continued)

*Primary Examiner* — Lorna M Douyon

(74) *Attorney, Agent, or Firm* — Gary J. Foose

(57) ABSTRACT

A cleaning article for cleaning a target surface is provided that includes a substrate having a first surface and second surface and a rheological solid composition comprising a crystallizing agent and an aqueous phase.

12 Claims, 3 Drawing Sheets

(56) References Cited

U.S. PATENT DOCUMENTS

| | | | |
|---|---|---|---|
| 8,075,977 B2 | 12/2011 | Curro et al. | |
| 8,093,192 B2 | 1/2012 | Liu et al. | |
| 8,146,197 B2 | 4/2012 | Yamada | |
| 8,151,402 B2 | 4/2012 | Takabayashi et al. | |
| 8,161,594 B2 | 4/2012 | Policicchio et al. | |
| 8,186,001 B2 | 5/2012 | Tsuchiya et al. | |
| 8,225,453 B2 | 7/2012 | Yamada | |
| 8,245,349 B2 | 8/2012 | Tsuchiya et al. | |
| 8,435,625 B2 | 5/2013 | Ruehe et al. | |
| 8,528,151 B2 | 9/2013 | Przepasniak | |
| 8,536,074 B2 | 9/2013 | Fereshtehkhou et al. | |
| 8,617,685 B2 | 12/2013 | Yamada | |
| 8,646,144 B2 | 2/2014 | Wada et al. | |
| 8,752,232 B2 | 6/2014 | Otsuka et al. | |
| 8,756,746 B2 | 6/2014 | Policicchio | |
| 8,763,197 B2 | 7/2014 | Policicchio et al. | |
| 8,793,832 B2 | 8/2014 | Yamada | |
| 8,851,776 B2 | 10/2014 | Schwarz et al. | |
| 8,858,971 B2 | 10/2014 | Rao | |
| 9,113,768 B2 | 8/2015 | Wada et al. | |
| 9,198,553 B2 | 12/2015 | Policicchio | |
| 9,204,775 B2 | 12/2015 | Pung et al. | |
| 9,296,176 B2 | 3/2016 | Escaffre et al. | |
| 9,339,165 B2 | 5/2016 | Vetter et al. | |
| 9,622,943 B2 | 4/2017 | Scala et al. | |
| 10,076,583 B2 | 9/2018 | Lynch | |
| 10,143,764 B2 | 12/2018 | Lynch | |
| 10,821,056 B2 | 11/2020 | Swartz et al. | |
| 10,835,455 B2 | 11/2020 | Payne et al. | |
| 10,932,996 B2 | 3/2021 | Baig et al. | |
| 11,812,909 B2 | 11/2023 | Lynch | |
| 2001/0048933 A1 | 12/2001 | L'Alloret | |
| 2002/0160088 A1 | 10/2002 | Sakaguchi et al. | |
| 2003/0021760 A1 | 1/2003 | Kumar et al. | |
| 2003/0053980 A1 | 3/2003 | Dodd et al. | |
| 2004/0185011 A1 | 9/2004 | Alexander | |
| 2005/0152851 A1 | 7/2005 | Kaminski | |
| 2006/0024245 A1 | 2/2006 | Gebreselassie et al. | |
| 2009/0155190 A1 | 6/2009 | Gebreselassie et al. | |
| 2010/0061941 A1 | 3/2010 | Gebreselassie | |
| 2011/0027328 A1 | 2/2011 | Baig et al. | |
| 2011/0053826 A1 | 3/2011 | Wise | |
| 2011/0262507 A1 | 10/2011 | Spring | |
| 2013/0111682 A1 | 5/2013 | Pung | |
| 2013/0302385 A1 | 11/2013 | Muenz et al. | |
| 2014/0289984 A1 | 10/2014 | Vetter | |
| 2015/0196185 A1* | 7/2015 | Fiske | A47K 7/03<br>427/372.2 |
| 2015/0313803 A1 | 11/2015 | Lynch et al. | |
| 2015/0313808 A1 | 11/2015 | Lynch et al. | |
| 2016/0051684 A1 | 2/2016 | Wang | |
| 2016/0120771 A1 | 5/2016 | Simonet et al. | |
| 2016/0346175 A1 | 12/2016 | Sasik et al. | |
| 2018/0127692 A1 | 5/2018 | Coope-epstein et al. | |
| 2019/0160022 A1 | 5/2019 | Chiou | |
| 2019/0298625 A1 | 10/2019 | Hilliard, Jr. et al. | |
| 2019/0343732 A1 | 11/2019 | Mao | |
| 2020/0000693 A1 | 1/2020 | Traynor et al. | |
| 2021/0007940 A1 | 1/2021 | Swartz et al. | |
| 2021/0315434 A1 | 10/2021 | Lynch et al. | |
| 2021/0315435 A1 | 10/2021 | Lynch et al. | |
| 2021/0315783 A1 | 10/2021 | Lynch et al. | |
| 2021/0315784 A1 | 10/2021 | Lynch et al. | |
| 2021/0315812 A1 | 10/2021 | Lynch et al. | |
| 2021/0322287 A1 | 10/2021 | Lynch et al. | |
| 2021/0322290 A1 | 10/2021 | Lynch et al. | |
| 2021/0322322 A1 | 10/2021 | Lynch et al. | |
| 2021/0330565 A1 | 10/2021 | Lynch et al. | |

FOREIGN PATENT DOCUMENTS

| | | | | |
|---|---|---|---|---|
| DE | 202007001353 | U1 | | 5/2007 |
| EP | 0916722 | A2 | | 5/1999 |
| EP | 2465487 | A2 | | 6/2012 |
| EP | 2170257 | B1 | | 11/2012 |
| GB | 2221389 | A | * | 2/1990 |
| WO | 9209679 | A1 | | 6/1992 |
| WO | 0196461 | A1 | | 12/2001 |
| WO | 03075735 | A1 | | 9/2003 |
| WO | 2007133265 | A2 | | 11/2007 |
| WO | 2009095891 | A1 | | 8/2009 |
| WO | 2010060653 | A2 | | 6/2010 |
| WO | 2014124066 | A1 | | 8/2014 |

OTHER PUBLICATIONS

F. V. Ryer, Oil & Soap, "Research Laboratory, Lever Brothers Company Cambridge, Massachusetts", dated Oct. 1946, pp. 310-313.

F. V. Ryer, et al. Growing Single Crystals, "A Method of Growing Single Crystals Of Sodium Stearate And Sodium Palmitate", dated Feb. 4, 1944, pp. 154-158.

Marc N. G. de Mul, et al. Langmuir 2000, "Solution Phase Behavior and Solid Phase Structure of Long-Chain Sodium Soap Mixtures", vol. 16, No. 22, dated 2000, pp. 8276-8284.

Masao Sambuichi, et al. Dewatering Of Gels, "Filtration, Food Chemical Engineering, Solid Liquid Separation, Dewatering, Expression, Gel", Journal of Chemical Engineering of Japan, vol. 27, No. 5, dated 1994, pp. 616-620.

Matthew L Lynch, Acid-soaps, "The study of acid-soap crystals has resulted in many conflicting data", Current Opinion in Colloid & Interface Science, dated 1997,pp. 495-500.

Matthew L. Lynch, et al. Acid-soap crystals, "Spectroscopic and Thermal Characterization of 1:2 Sodium Soap/Fatty Acid Acid-Soap Crystals", J. Phys. Chem., vol. 100, No. 1, 1996, pp. 357-361.

Matthew L. Lynch, Structure of Fatty Acid-Soap Crystals,"Intermolecular Interactions and the Structure of Fatty Acid-Soap Crystals", J. Phys. Chem. B, vol. 105, No. 2, dated 2001, pp. 552-561.

Theodore P. Labuza, et al. , "Measurement Of Gel Water-Binding Capacity By Capillary Suction Potential", Journal of Food Science, vol. 43, dated 1978 ,pp. 1264-1269.

Unpublished U.S. Appl. No. 17/196,379, filed Mar. 9, 2021, to first inventor Geoffrey Marc Wise.

All Office Actions; U.S. Appl. No. 18/450,176, filed Aug. 15, 2023.

Unpublished U.S. Appl. No. 18/450,176, filed Aug. 15, 2023, to Matthew Lawrence Lynch et al.

Robert B Saper et al.," An Essential Micronutrient", vol. 79, No. 9, dated May 1, 2009, pp. 768-772.

* cited by examiner

CLEANING ARTICLE WITH PREFERENTIAL RHEOLOGICAL SOLID COMPOSITION

FIELD OF THE INVENTION

The present invention relates to hard surface cleaning articles having an effective type of rheological solid composition included. The rheological solid composition comprising more than about 80% water and having a crystallizing agent with an elongated, fiber-like crystal habit. Wherein the rheological solid composition allows for a unique aqueous phase expression glide when rubbed on the hard surface; and wherein the rheological solid also exhibits properties of sufficient firmness, and thermal stability critical for practical commercial viability.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. Laminiferous wipes have been proposed, as disclosed in U.S. Pat. No. 9,296,176. But, rags, wipes, and paper towels are problematic for reasons such as hygiene (the user's hands may touch chemicals, dirt or the surface during cleaning), reach (it may be difficult to insert the user's hand with the rag, wipe or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include synthetic fiber bundles, called tow fibers, attached to a sheet as shown in U.S. Pat. Nos. 6,241,835; 6,329,308; 6,554,937; 6,774,070; 6,813,801; 7,003,856; 7,566,671; 7,712,178; 7,779,502; 7,937,797; 8,146,197; 8,151,402; 8,161,594, 8,186,001; 8,245,349; 8,646,144; 8,528,151; 8,617,685; 8,756,746; 8,763,197; 9,113,768 and 9,198,553.

For cleaning of floors and other hard surfaces, various cleaning sheets have been used in conjunction with various cleaning implements. The sheets are removably attachable to the cleaning implement, which allows the user to remain upright and provides ergonomic convenience. For example, microfiber cleaning pads have been used for wet and dry cleaning of floors and other target surfaces. Microfiber pads may be nylon and are intended to be washed and reused. But microfiber pads may damage the floor and still leave filming/streaking, particularly after repeated washings.

Accordingly, nonwoven cleaning sheets have been used, particularly for cleaning of dry target surfaces. Nonwoven cleaning sheets are typically discarded after a single use, and not laundered or otherwise restored. Nonwoven sheets for cleaning hard surfaces, such as floors, countertops, etc., are known in the art as shown in U.S. Pat. Nos. 3,629,047 and 5,144,729. To provide durability, a continuous filament or network structure has been proposed, as disclosed in U.S. Pat. Nos. 3,494,821; 4,144,370 and 4,808,467 and polymers as described in U.S. Pat. No. 5,525,397. Other attempts include providing a surface which is textured with peaks and valleys for trapping debris as disclosed in commonly assigned U.S. Pat. No. 6,797,357.

Nonwoven sheets having tow fibers have been proposed, as disclosed in U.S. Pat. Nos. 6,143,393; 8,225,453; 8,617,685; 8,752,232; 8,793,832 and in commonly assigned U.S. Pat. No. 8,075,977. Webs with elastic behavior have been proposed in commonly assigned U.S. Pat. No. 5,691,035. Sheets with recesses have also been proposed, as disclosed in U.S. Pat. No. 6,245,413; and 7,386,907. Sheets with cavities have been proposed, as disclosed in U.S. Pat. No. 6,550,092. An adhesive cleaning sheet is proposed in U.S. Pat. No. 7,291,359. But these attempts require additional complexity in the manufacture of the nonwoven.

Yet other attempts use coatings of wax and/or oil. Coatings of wax and oil are generally disclosed in U.S. Pat. Nos. 6,550,092; 6,777,064; 6,797,357; 6,936,330; 7,386,907; 7,560,398; 8,435,625; 8,536,074; 9,204,775; 9,339,165 and EP 1482828. Commonly assigned US 2004/1063674 teaches a mineral oil. Specific amphiphilic coatings are disclosed in U.S. Pat. No. 8,851,776. U.S. Pat. No. 8,093,192 teaches partially hydrogenated soy oil, but does not recognize how to use the oil for hard surface cleaning or for processing a cleaning article. Swiffer® Dusters, sold by the instant assignee, have been sold with up to 7 weight percent oil for off-the-floor cleaning.

Water is commonly entrained onto/into cellulose and non-woven substrates, so that the assembled products made from them can be used to clean and treat various surfaces including—but not limited to, floors, kitchen counters, food, skin, ranging from parts of the face and baby bottoms, nails, and hair. Cellulose and non-woven substrates do not 'hold' the water in place in a controlled way. As a consequence, the assembled products using them are leaky, such that water drains from the products when removed from the packaging. Further, when using such an assembled product, it is not possible to control the release of the water, so that water is often released unevenly over the length of the intend use. Further, the packaging containing such assembled products can leak, making these products difficult to ship in e-commerce. Finally, such assembled products are not currently able to deliver a range of non-soluble actives because of the un-structured nature of water allowing for uneven distribution of such actives (i.e. 'creaming' or 'settling'). Consumers need assembled products with substrates that contain a structured water-rich phase that allows immobilizing water, water-soluble actives and water-insoluble actives for treatment of the surfaces, that are able to release the water-rich phase controllably under various in-use conditions. In a common vernacular, consumers need said assembled products that are 'dry-to-the-touch' and 'wet-to-the-use'.

Conventional high-water containing compositions, such as rheological solid compositions, lack one or more desirable properties, for example—sufficient firmness, aqueous phase expression and thermal stability, particularly those comprising sodium carboxylate-based crystallizing agents. For instance, to produce a firm rheological solid composition using sodium stearate (C18) as a gelling agent requires the inclusion of high levels of polyols (e.g. propylene glycol and glycerin), as a solubility aid for the sodium stearate during processing, even at high process temperatures. Typical compositions include about 50% propylene glycol, 25% glycerin and only 25% water (EP2170257 and EP2465487). For a second example, traditional soap bars are comprised of similar gelling agents, but are far too concentrated in sodium carboxylate to effectively allow for aqueous phase expression with compression. Another example is where thermal stability is compromised in compositions by adding a too soluble gelling agent, as in (Kacher et al., U.S. Pat. No. 5,340,492). Specifically, the thermal stability temperature of the composition is too low to effectively survive reliably on the shelf life or in the supply chain.

What is needed is a cleaning article that includes a rheological solid composition that has sufficient firmness, aqueous phase expression and thermal stability. The present invention of a self-supporting structure comprising a crystalline mesh of a relatively rigid, frame of fiber-like crystalline particles, which if compressed expresses aqueous phase provides the properties of sufficient firmness, thermal stability, and aqueous phase expression.

SUMMARY OF THE INVENTION

A cleaning article for cleaning a target surface is provided that includes a substrate having a first surface and second surface opposed thereto and rheological solid composition that comprises crystallizing agent and aqueous phase; wherein, the rheological solid composition has a firmness between about 0.1 N to about 50.0 N as determined by the FIRMNESS TEST METHOD; a thermal stability of about 40° C. to about 95° C. as determined by the THERMAL STABILITY TEST METHOD; a liquid expression of between about 100 J m-3 to about 8,000 J m-3 as determined by the AQUEOUS PHASE EXPRESSION TEST METHOD; and wherein the crystallizing agent is a salt of fatty acids containing from about 13 to about 18 carbon atoms.

BRIEF DESCRIPTION OF THE DRAWINGS

While the specification concludes with claims particularly pointing out and distinctly claiming the subject matter that is regarded as the present disclosure, it is believed that the disclosure will be more fully understood from the following description taken in conjunction with the accompanying drawings. Some of the figures may have been simplified by the omission of selected elements for the purpose of more clearly showing other elements. Such omissions of elements in some figures are not necessarily indicative of the presence or absence of particular elements in any of the exemplary embodiments, except as may be explicitly delineated in the corresponding written description. None of the drawings are necessarily to scale.

DETAILED DESCRIPTION OF THE INVENTION

The present invention includes a rheological solid composition comprising a crystalline mesh. The crystalline mesh ("mesh") comprises a relatively rigid, three-dimensional, interlocking crystalline skeleton framework of fiber-like crystalline particles (formed from crystallizing agents), having voids or openings containing aqueous solution and optionally one or more actives. The mesh provides a self-supporting structure, such that a rheological solid composition may 'stand on its own' when resting on a surface. If compressed above a critical stress, the mesh allows the rheological solid composition to express the entrapped aqueous phase, and optionally water soluble actives. The rheological solid compositions of the present invention include crystallizing agent(s), aqueous phase, and optionally active and may be combined with a device to enable application.

The invention described herein includes an assembled cleaning article containing a substrate and a structured aqueous phase. The substrate is selected—but not limited to, from the group of films, paper, tissue, cardstock, thermoplastics, thermosets, wovens, foams, and nonwoven substrates (and combinations and or laminations of materials) comprising natural or synthetic fibers, polyolefins, starch, polyesters, polyhydroxyalkanoates, and foils. These substrate materials may be formed or apertured in any way known in the art to provide texture or other desirable properties. The structured water-rich phase is a rheological solid composition that can stand on its own when placed on a surface, and is composed of several parts: crystallizing agent, aqueous phase, and optionally water-insoluble and water-insoluble actives. The crystallizing agent is selected from a group consisting of sodium carboxylates which form intertwining crystalline fibers to form a mesh that provides both the solid-like rheology and voids in which the aqueous phase and optional actives is/are immobilized. The aqueous phase is predominately water, but may contain ingredients such as surfactants, solvents, cohesive fibers, gums, and salts, and combinations thereof, for required applications. The water non-soluble actives add functional benefit(s) to applications of interest and are selected from the group—but not limited to, essential oils, natural oils, skin moisturizers, conditioning agents, scents, flavors, and combinations thereof, and are immobilized in the voids of the crystalline mesh. Critically, when the assembled product is used, application of a yield stress to the crystalline mesh breaks the crystalline fibers and allow the water-rich phase to be released from the structure. It is this structure-function, that allows the invention to meet the consumer needs of controllably releasing water and active ingredients in a tunable fashion.

Figure 3:
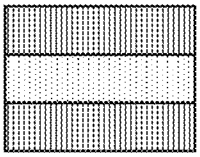
FIG. 3 shows a rheological solid composition and substrate.
Figure 4:
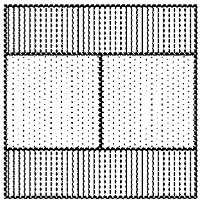
FIG. 4 shows a rheological solid composition and substrate.
Figure 5:
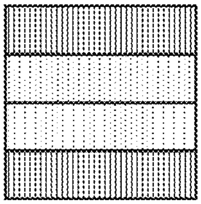
FIG. 5 shows a rheological solid composition and substrate.

The inventive assembled products may be assembled with one or more domains of rheological solid compositions, to enhance performance. In one embodiment, a layer of a rheological solid composition may form a layer on the substrate. In another embodiment, a rheological solid composition may be entrained in the substrate. In another embodiment, a rheological solid composition may be placed between two layers of substrate (FIG. 3). In another embodiment, a rheological solid composition may be placed between two different substrate layers. In another embodiment, two or more different rheological solid compositions with different yield stresses and or active ingredients or amounts of actives may be applied side-by-side as different domains on a substrate (FIG. 4). In another embodiment, two or more different rheological solid compositions with different yield stresses and or active ingredients or amounts of actives may be applied as layers of different domains on one or more substrates (FIG. 5). In another embodiment, the assembled product is a floor cleaner. In another embodiment, the assembled product is a toilet tissue. In another embodiment, the assembled product is a baby wipe. In another embodiment, the assembled product is a hair and/or scalp cleaner. In another embodiment, said the assembled product is a floor cleaner. In another embodiment the assembled product is a general wipe. The assembled product may be produced—but not limited to, spraying a rheological solid process composition onto a substrate, wiping a rheological solid process composition onto a substrate, or casting a film of a rheological solid composition which is subsequently placed onto the substrate.

Figure 6:
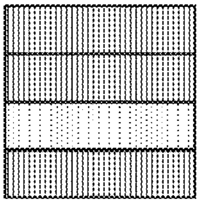
FIG. 6 shows a rheological solid composition and substrate.

The inventive assembled products may be assembled with one or more domains of substrate where each substrate material or material layer provides a unique function, to enhance the overall performance of the assembled product. In one embodiment, there is a single substrate with a rheological solid composition. In another embodiment, there single domain of rheological solid composition between two substrates. In another embodiment, the substrate may have soil capture functionality—enabled by soil capture polymer or the inclusion of pulp, to clean the substrate. In another embodiment, the cellulose substrate may have low-strength-when-wet properties to enable toilet flushing, and may require silicone coatings or barriers to prevent the rheological solid compositions for wicking water into the substrate. In another embodiment, the substrate may only allow the flow of the rheological solid composition in one direction. In another embodiment, the substrate may be water soluble, where the substrate might be composed of polyvinyl alcohol. In another embodiment, there are multiple stacked substrate layers (FIG. 6)

These embodiments are not meant to be limiting examples, instead reflect a small selection of possible combinations of substrate and rheological solid compositions.

It is surprising that it is possible to prepare rheological solid compositions that exhibit sufficient firmness, aqueous phase expression and thermal stability. Not wishing to be bound by theory, it is believed that sodium carboxylates present in high-water compositions (e.g. above about 80%) and correct chain length purity may form elongated, fiber-like crystal habits. These crystals form mesh structures that result in rheological solid compositions even at very low concentrations. Firmness may be achieved by carefully adjusting the concentration and chain length distribution of the crystallizing agent. Aqueous phase expression may be achieved from these rheological solid structures, by compression above a yield behavior that breaks the mesh structure allowing the water to flow from the composition. One skilled in the art recognizes this as a plastic deformation of the mesh structure. This stands in contrast to other gelling agents like gelatin, that can be formulated at very high-water concentrations but do not express water with compression. Thermal Stability may be achieved by ensuring the proper chain length and chain length distributions to ensure the mesh does not solubilize when heated above 40° C. This is an important property in relation to the shelf-life and supply chain for consumer products. Addition of sodium chloride can be used to increase the thermal stability of the composition but should be added correctly to ensure the proper formation of the mesh. These discovered design elements stand in contrast to compositions prepared with too-soluble a gelling agent to be practically thermal stable. Finally, such rheological solid compositions are prepared by cooling the mixture largely quiescently, in contrast to freezer or other mechanically invasive processes. Not wishing to be bound by theory, quiescent processes allow the formation of very large and efficient fibrous crystals rather the breaking them into smaller less efficient crystals.

Crystallizing Agent(s)

Figure 1:
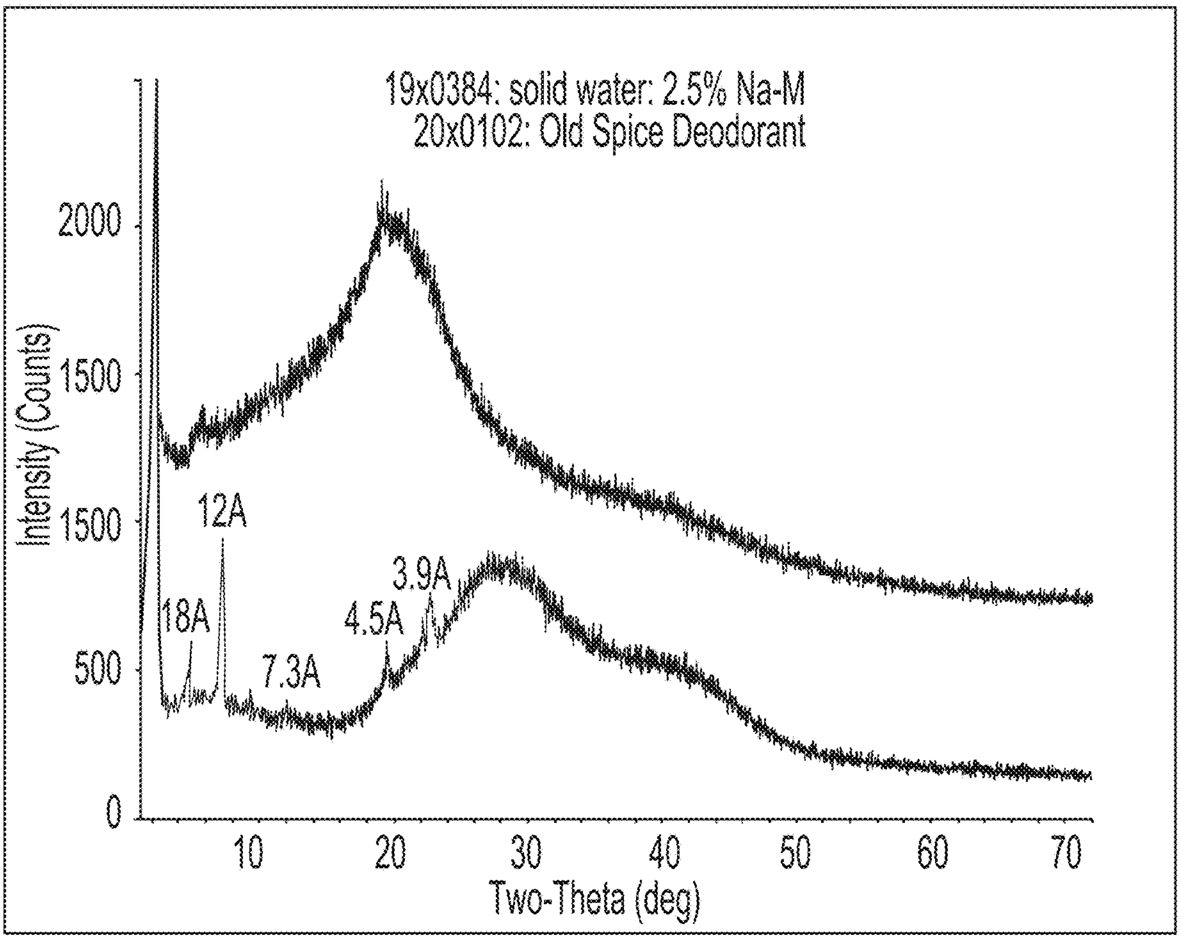
FIG. 1. X-ray Diffraction Pattern.

In the present invention the mesh of a rheological solid composition includes fiber-like crystalline particles formed from crystallizing agents; wherein "crystallizing agent" as used herein includes sodium salts of fatty acid with shorter chain length (C13-C18), such as sodium myristate (C14). Commercial sources of crystallizing agent usually comprise complicated mixtures of molecules, often with chain lengths between C10 to C22. The rheological solid compositions are best achieved with a 'narrow blend'—or distribution of crystallizing agent chain lengths, further best achieved with blends in the absence of very short chain lengths (C12 or shorter) and measurable amounts of unsaturation on the chains of the fatty acid sodium salts, and best achieved with a single chain length between C13 to C17, coupled with controlled crystallizing processing. Accordingly, rheological solid compositions are best achieved when the blend of the chain length distribution is preferably greater than about Po>0.3, more preferably about Po>0.5, more preferably about Po>0.6, more preferably about Po>0.7 and most preferably about Po>0.8, as determined by the BLEND TEST METHOD. One skilled in the art, recognizes crystalline particles as exhibiting sharp scattering peaks between 0.25-60 deg. 2θ in powdered x-ray diffraction measurements. This is in sharp contrast to compositions in which these materials are used as gelling agents, which show broad amorphic scattering peaks emanating from poorly formed solids which lack the long-range order of crystalline solids (FIG. 1).

Figure 2:
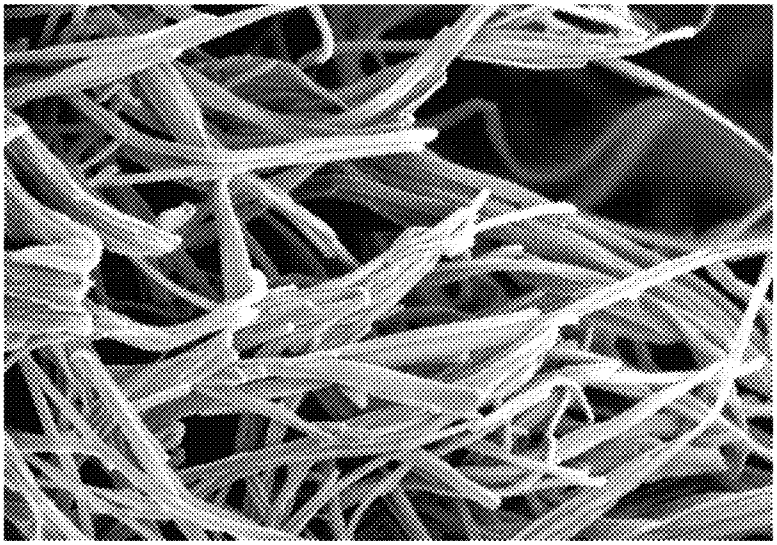
FIG. 2. SEM of Interlocking Mesh.

Rheological solid compositions comprise greater than about 80% water and are 'structured' by a mesh of interlocking, fiber-like crystalline particles of mostly single-chain length, as described above, see (FIG. 2). The term 'fiber-like crystalline particle' refers to a particle in which the length of the particle in the direction of its longest axis is greater than 10× the length of the particle in any orthogonal direction. The fiber-like crystalline particles produce a mesh at very low concentrations (~0.5 wt %) which creates a solid that yields only with a minimum applied stress—i.e., rheological solid. The aqueous phase primarily resides in the open spaces of the mesh. In preparing these compositions, the crystallizing agent is dissolved in aqueous phase using heat. The fiber-like crystalline particles form into the mesh as the mixture cools over minutes to hours.

Such compositions exhibit three properties used to make effective consumer product for envisioned applications:

Aqueous Phase Expression

Aqueous phase expression is an important property for consumer applications in the present invention, expressed in work to express water per unit volume, where preferred compositions are between 300 J m-3 and about 9,000 J m-3, more preferably between 1,000 J m-3 and about 8,000 J m-3, more preferably between 2,000 J m-3 and about 7,000 J m-3 and most preferably between 2,500 J m-3 and about 6,000 J m-3, as determined by the AQUEOUS PHASE EXPRESSION TEST METHOD. These limits allow for viable product compositions that—for example, provide evaporative and/or sensate-based cooling when the composition is applied to the skin and cleaning when applied to a hard surface. These work limits are in contrast to bar soaps and deodorant sticks that do not express aqueous phase when compressed. These work limits are also in contrast to gelatins that likewise do not express water when compressed. So, it is surprising that high-water compositions can be created with these materials, that express aqueous phase with compression. Not wishing to be bound by theory, it is believed this a result of a network of crystalline materials that break up during the application of sufficient stress—releasing the aqueous phase with no uptake when the compression is released.

Firmness

Firmness should be agreeable to consumer applications, in forming a structured rheological solid composition, with preferred embodiments between about 0.5 N to about 25.0 N, more preferably between 1.0 N to about 20.0 N, more preferably between 3.0 N to about 15.0 N and most preferably between 5.0 N and about 10.0 N. These firmness values allow for viable product compositions that may retain their shape when resting on a surface, and as such are useful as a rheological solid stick to provide a dry-to-the-touch but wet-to-the-push properties. The firmness values are significantly softer than bar soaps and deodorants, which exceed these values. So, it is surprising that high-water compositions can be created that remain as rheological solid compositions with between about 0.25 wt % to about 10 wt % crystallizing agents, more preferably between about 0.5 wt % to about 7 wt % crystallizing agent and most preferably between about 1 wt % to about 5 wt % crystallizing agent. Not wishing to be bound by theory, it is believed this a result of crystallizing agent materials creating the interlocking mesh that provides sufficient firmness.

Thermal Stability

Thermal stability is used to ensure that the structured rheological solid composition can be delivered as intended to the consumer through the supply chain, preferably with thermal stability greater than about 40° C., more preferably greater than about 45° C. and most preferably greater than about 50° C., as determined by the THERMAL STABILITY TEST METHOD. Creating compositions with acceptable thermal stability is difficult, as it may vary unpredictably with concentration of the crystallizing agent and soluble active agent(s). Not wishing to be bound by theory, thermal stability results from the insolubility of the crystallizing agent in the aqueous phase. Conversely, thermal instability is thought to result from complete solubilization of the crystallizing agent that comprised the mesh.

Chain Length Blends

Effective chain length blends allow the creation of effective mesh microstructures in rheological solid compositions. In fact, adhoc (or informed selection) of crystallizing agents often leads to liquid or very soft compositions. The crystallizing agent may comprise a mixture of sodium carboxylate molecules, where each molecule has a specific chain length. For example, sodium stearate has a chain length of 18, sodium oleate has a chain length of 18:1 (where the 1 reflects a double bond in the chain), sodium palmitate has a chain length of 16, and so on. The chain length distribution—or the quantitative weight fraction of each chain length in the crystallizing agent, can be determined by the BLEND TEST METHOD, as described below. Commercial sources of crystallizing agent usually comprise complicated mixtures of molecules, often with chain lengths between 10 to 22.

Rheological solid compositions of the present invention have preferred chain length blends, as described by 'Optimal Purity' (Po) and 'Single Purity' (Ps), determined by the BLEND TEST METHOD. Sodium carboxylate crystallizing agents can have an 'Optimal Chain Length' of between 13 to 22 carbons and can be used alone or combined to form mesh structures that satisfy all three performance criteria of a rheological solid composition. Not wishing to be bound by theory, it is believed that these chain length molecules (13 to 17) have an optimal hydrophilic-hydrophobic balance and a solubilization temperature (e.g., Krafft Temperature) sufficiently below the practical process temperature that they can pack into crystals efficiently. Sodium carboxylate crystallizing agents can have 'Unsuitable Chain Length' crystallizing agents have chain length of sodium carboxylate molecules of 10, 12, 18:1 and 18:2 (i.e., shorter or unsaturated chain lengths). When present in compositions alone or in some combinations with 'optimal chain length' molecules, they do not form rheological solid composition that meet the required performance criteria. Accordingly, inventive compositions should have the proper blend of crystallizing agent molecules, to ensure the proper properties of the rheological solid composition. Po describes the total weight fraction of optimal chain length molecules of crystallizing agent to the total weight of crystallizing agent molecules, that is preferably Po>0.4, more preferably Po>0.6, more preferably Po>0.8 and most preferably Po>0.90. Ps describes the total weight fraction of the most common chain length molecule in the crystallizing agent to the total weight of crystallizing agent, that is preferably Ps>0.5, more preferably Ps>0.6, more preferably Ps>0.7, more preferably Ps>0.9.

Aqueous Phase

The rheological solid composition may include an aqueous carrier. The aqueous carrier which is used may be distilled, deionized, or tap water. Water may be present in any amount for the rheological solid composition to be an aqueous solution. Water may be present in an amount of about 80 wt % to 99.5 wt %, alternatively about 90 wt % to about 99.5 wt %, alternatively about 92 wt % to about 99.5 wt %, alternatively about 95 wt %, by weight of the rheological solid composition. Water containing a small amount of low molecular weight monohydric alcohols, e.g., ethanol, methanol, and isopropanol, or polyols, such as ethylene glycol and propylene glycol, can also be useful. However, the volatile low molecular weight monohydric alcohols such as ethanol and/or isopropanol should be limited since these volatile organic compounds will contribute both to flammability problems and environmental pollution problems. If small amounts of low molecular weight monohydric alcohols are present in the rheological solid composition due to the addition of these alcohols to such things as perfumes and as stabilizers for some preservatives, the level of monohydric alcohol may about 1 wt % to about 5 wt %, alternatively less than about 6 wt %, alternatively less than about 3 wt %, alternatively less than about 1 wt %, by weight of the rheological solid composition.

However, other components can be optionally dissolved with the low molecular weight monohydric alcohols in the water to create an aqueous phase. Combined, these components are referred to as soluble active agents. Such soluble active agents include, but are not limited to, catalysts, activators, peroxides, enzymes, antimicrobial agents, preservatives, sodium chloride, surfactants and polyols. The crystallizing agent and insoluble active agents may be dispersed in the aqueous phase.

Catalysts

In embodiments, soluble active agents can include one or more metal catalysts. In embodiments, the metal catalyst can include one or more of dichloro-1,4-diethyl-1,4,8,11-tetraaazabicyclo[6.6.2]hexadecane manganese(II); and dichloro-1,4-dimethyl-1,4,8,11-tetraaazabicyclo[6.6.2]hexadecane manganese(II). In embodiments, the non-metal catalyst can include one or more of 2-[3-[(2-hexyldodecyl)oxy]-2-(sulfooxy)propyl]-3,4-dihydroisoquinolinium, inner salt; 3,4-dihydro-2-[3-[(2-pentylundecyl)oxy]-2-(sulfooxy)propyl]isoquinolinium, inner salt; 2-[3-[(2-butyldecyl)oxy]-2-(sulfooxy)propyl]-3,4-dihydroisoquinolinium, inner salt; 3,4-dihydro-2-[3-(octadecyloxy)-2-(sulfooxy)propyl]isoquinolinium, inner salt; 2-[3-(hexadecyloxy)-2-(sulfooxy)propyl]-3,4-dihydroisoquinolinium, inner salt; 3,4-dihydro-2-[2-(sulfooxy)-3-(tetradecyloxy)propyl]isoquinolinium, inner salt; 2-[3-(dodecyloxy)-2-(sulfooxy)propyl]-3,4-dihydroisoquinolinium, inner salt; 2-[3-[(3-hexyldecyl)oxy]-2-(sulfooxy)propyl]-3,4-dihydroisoquinolinium, inner salt; 3,4-dihydro-2-[3-[(2-pentylnonyl)oxy]-2-(sulfooxy)propyl] isoquinolinium, inner salt; 3,4-dihydro-2-[3-[(2-propylheptyl)oxy]-2-(sulfooxy)propyl]isoquinolinium, inner salt; 2-[3-[(2-butyloctyl)oxy]-2-sulfooxy)propyl]-3,4-dihydroisoquinolinium, inner salt; 2-[3-(decyloxy)-2-(sulfooxy) propyl]-3,4-dihydroisoquinolinium, inner salt; 3,4-dihydro-2-[3-(octyloxy)-2-(sulfooxy)propyl]isoquinolinium, inner salt; and 2-[3-[(2-ethylhexyl)oxy]-2-(sulfooxy)propyl]-3,4-dihydroisoquinolinium, inner salt.

Activators

In embodiments, soluble active agent can include one or more activators. In embodiments, the activator can include one or more of tetraacetyl ethylene diamine (TAED); benzoylcaprolactam (BzCL); 4-nitrobenzoylcaprolactam; 3-chlorobenzoylcaprolactam; benzoyloxybenzenesulphonate (BOBS); nonanoyloxybenzene-sulphonate (NOBS); phenyl benzoate (PhBz); decanoyloxybenzenesulphonate ($C_{10}$—OBS); benzoylvalerolactam (BZVL); octanoyloxybenzenesulphonate ($C_8$—OBS); perhydrolyzable esters; 4-[N-(nonaoyl) amino hexanoyloxy]-benzene sulfonate sodium salt (NACA-OBS); dodecanoyloxybenzenesulphonate (LOBS or $C_{12}$—OBS); 10-undecenoyloxybenzenesulfonate (UDOBS or $C_{11}$—OBS with unsaturation in the 10 position); decanoyloxybenzoic acid (DOBA); (6-oclanamidocaproyl)oxybenzenesulfonate; (6-nonanamidocaproyl) oxybenzenesulfonate; and (6-decanamidocaproyl)oxybenzenesulfonate.

Peroxy-Carboxylic Acids

In embodiments, soluble active agent can include one or more preformed peroxy carboxylic acids. In embodiments, the peroxy carboxylic acids can include one or more of peroxymonosulfuric acids; perimidic acids; percabonic acids; percarboxilic acids and salts of said acids; phthalimidoperoxyhexanoic acid; amidoperoxyacids; 1,12-diperoxydodecanedioic acid; and monoperoxyphthalic acid (magnesium salt hexahydrate), wherein said amidoperoxyacids may include N,N'-terephthaloyl-di(6-aminocaproic acid), a monononylamide of either peroxysuccinic acid (NAPSA) or of peroxyadipic acid (NAPAA), or N-nonanoylaminoperoxycaproic acid (NAPCA).

In embodiments, water-based and/or water-soluble benefit agent can include one or more diacyl peroxide. In embodiments, the diacyl peroxide can include one or more of dinonanoyl peroxide, didecanoyl peroxide, diundecanoyl peroxide, dilauroyl peroxide, and dibenzoyl peroxide, di-(3,5,5-trimethyl hexanoyl) peroxide, wherein said diacyl peroxide can be clatharated.

Peroxides

In embodiments, soluble active agent can include one or more hydrogen peroxide. In embodiments, hydrogen peroxide source can include one or more of a perborate, a percarbonate a peroxyhydrate, a peroxide, a persulfate and mixtures thereof, in one aspect said hydrogen peroxide source may comprise sodium perborate, in one aspect said sodium perborate may comprise a mono- or tetra-hydrate, sodium pyrophosphate peroxyhydrate, urea peroxyhydrate, trisodium phosphate peroxyhydrate, and sodium peroxide.

Enzymes

In embodiments, soluble active agent can include one or more enzymes. In embodiment, the enzyme can include one or more of peroxidases, proteases, lipases, phospholipases, cellulases, cellobiohydrolases, cellobiose dehydrogenases, esterases, cutinases, pectinases, mannanases, pectate lyases, keratinases, reductases, oxidases, phenoloxidases, lipoxygenases, ligninases, pullulanases, tannases, pentosanases, glucanases, arabinosidases, hyaluronidase, chondroitinase, laccases, amylases, and dnases.

Sensate

In embodiments, soluble active agent can include one or more components that provide a sensory benefit, often called a sensate. Sensates can have sensory attributes such as a warming, tingling, or cooling sensation. Suitable sensates include, for example, menthol, menthyl lactate, leaf alcohol, camphor, clove bud oil, *eucalyptus* oil, anethole, methyl salicylate, eucalyptol, *cassia,* 1-8 menthyl acetate, eugenol, oxanone, alpha-irisone, propenyl guaethol, thymol, linalool, benzaldehyde, cinnamaldehyde glycerol acetal known as CGA, Winsense WS-5 supplied by Renessenz-Symrise, Vanillyl butyl ether known as VBE, and mixtures thereof.

In certain embodiments, the sensate comprises a coolant. The coolant can be any of a wide variety of materials. Included among such materials are carboxamides, menthol, ketals, diols, and mixtures thereof. Some examples of carboxamide coolants include, for example, paramenthan carboxyamide agents such as N-ethyl-p-menthan-3-carboxamide, known commercially as "WS-3", N,2,3-trimethyl-2-isopropylbutanamide, known as "WS-23," and N-(4-cyanomethylphenyl)-ρ-menthanecarboxamide, known as G-180 and supplied by Givaudan. G-180 generally comes as a 7.5% solution in a flavor oil, such as spearmint oil or peppermint oil. Examples of menthol coolants include, for example, menthol; 3-1-menthoxypropane-1,2-diol known as TK-10, manufactured by Takasago; menthone glycerol acetal known as MGA manufactured by Haarmann and Reimer; and menthyl lactate known as Frescolat® manufactured by Haarmann and Reimer. The terms menthol and menthyl as used herein include dextro- and levorotatory isomers of these compounds and racemic mixtures thereof.

In certain embodiments, the sensate comprises a coolant selected from the group consisting of menthol; 3-1-menthoxypropane-1,2-diol, menthyl lactate; N,2,3-trimethyl-2-isopropylbutanamide; N-ethyl-p-menthan-3-carboxamide; N-(4-cyanomethylphenyl)-ρ-menthanecarboxamide, and combinations thereof. In further embodiments, the sensate comprises menthol; N,2,3-trimethyl-2-isopropylbutanamide.

Surfactant

Detersive Surfactant: Suitable detersive surfactants include anionic detersive surfactants, non-ionic detersive surfactant, cationic detersive surfactants, zwitterionic detersive surfactants and amphoteric detersive surfactants and mixtures thereof. Suitable detersive surfactants may be linear or branched, substituted or un-substituted, and may be derived from petrochemical material or biomaterial. Preferred surfactant systems comprise both anionic and nonionic surfactant, preferably in weight ratios from 90:1 to 1:90. In some instances a weight ratio of anionic to nonionic surfactant of at least 1:1 is preferred. However, a ratio below 10:1 may be preferred. When present, the total surfactant level is preferably from 0.1% to 60%, from 1% to 50% or even from 5% to 40% by weight of the subject composition.

Anionic detersive surfactant: Anionic surfactants include, but are not limited to, those surface-active compounds that contain an organic hydrophobic group containing generally 8 to 22 carbon atoms or generally 8 to 18 carbon atoms in their molecular structure and at least one water-solubilizing group preferably selected from sulfonate, sulfate, and carboxylate so as to form a water-soluble compound. Usually, the hydrophobic group will comprise a C8-C22 alkyl, or acyl group. Such surfactants are employed in the form of water-soluble salts and the salt-forming cation usually is selected from sodium, potassium, ammonium, magnesium and mono-, with the sodium cation being the usual one chosen.

Anionic surfactants of the present invention and adjunct anionic cosurfactants, may exist in an acid form, and said acid form may be neutralized to form a surfactant salt which is desirable for use in the present compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, oligamines, or alkanolamines. Alkanolamines are preferred. Suitable non-limiting examples including monoethanolamine, diethanolamine, triethanolamine, and other linear or branched alkanolamines known in the art; for example, highly preferred alkanolamines include 2-amino-1-propanol, 1-aminopropanol, monoisopropanolamine, or 1-amino-3-propanol. Amine neutralization may be done to a full or partial extent, e.g. part of the anionic surfactant mix may be neutralized with sodium or potassium and part of the anionic surfactant mix may be neutralized with amines or alkanolamines.

Suitable sulphonate detersive surfactants include methyl ester sulphonates, alpha olefin sulphonates, alkyl benzene sulphonates, especially alkyl benzene sulphonates, preferably $C_{10-13}$ alkyl benzene sulphonate. Suitable alkyl benzene sulphonate (LAS) is obtainable, preferably obtained, by sulphonating commercially available linear alkyl benzene (LAB). Suitable LAB includes low 2-phenyl LAB, such as those supplied by Sasol under the tradename Isochem® or those supplied by Petresa under the tradename Petrelab®, other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used Suitable sulphate detersive surfactants include alkyl sulphate, preferably $C_{8-18}$ alkyl sulphate, or predominantly $C_{12}$ alkyl sulphate.

A preferred sulphate detersive surfactant is alkyl alkoxylated sulphate, preferably alkyl ethoxylated sulphate, preferably a $C_{8-18}$ alkyl alkoxylated sulphate, preferably a $C_{8-18}$ alkyl ethoxylated sulphate, preferably the alkyl alkoxylated sulphate has an average degree of alkoxylation of from 0.5 to 20, preferably from 0.5 to 10, preferably the alkyl alkoxylated sulphate is a $C_{8-18}$ alkyl ethoxylated sulphate having an average degree of ethoxylation of from 0.5 to 10, preferably from 0.5 to 5, more preferably from 0.5 to 3. The alkyl alkoxylated sulfate may have a broad alkoxy distribution or a peaked alkoxy distribution.

The alkyl sulphate, alkyl alkoxylated sulphate and alkyl benzene sulphonates may be linear or branched, including 2 alkyl substituted or mid chain branched type, substituted or un-substituted, and may be derived from petrochemical material or biomaterial. Preferably, the branching group is an alkyl. Typically, the alkyl is selected from methyl, ethyl, propyl, butyl, pentyl, cyclic alkyl groups and mixtures thereof. Single or multiple alkyl branches could be present on the main hydrocarbyl chain of the starting alcohol(s) used to produce the sulfated anionic surfactant used in the compositions of the invention. Most preferably the branched sulfated anionic surfactant is selected from alkyl sulfates, alkyl ethoxy sulfates, and mixtures thereof.

Alkyl sulfates and alkyl alkoxy sulfates are commercially available with a variety of chain lengths, ethoxylation and branching degrees. Commercially available sulfates include those based on Neodol alcohols ex the Shell company, Lial-Isalchem and Safol ex the Sasol company, natural alcohols ex The Procter & Gamble Chemicals company.

Other suitable anionic detersive surfactants include alkyl ether carboxylates.

Non-ionic detersive surfactant: Suitable non-ionic detersive surfactants are selected from the group consisting of: $C_{8-18}$ alkyl ethoxylates, such as, NEODOL® non-ionic surfactants from Shell; $C_{6-12}$ alkyl phenol alkoxylates wherein preferably the alkoxylate units are ethyleneoxy units, propyleneoxy units or a mixture thereof; $C_{12-18}$ alcohol and $C_{6-12}$ alkyl phenol condensates with ethylene oxide/propylene oxide block polymers such as Pluronic® from BASF; alkylpolysaccharides, preferably alkylpolyglycosides; methyl ester ethoxylates; polyhydroxy fatty acid amides; ether capped poly(oxyalkylated) alcohol surfactants; and mixtures thereof.

Suitable non-ionic detersive surfactants are alkylpolyglucoside and/or an alkyl alkoxylated alcohol. Suitable non-ionic detersive surfactants include alkyl alkoxylated alcohols, preferably $C_{8-18}$ alkyl alkoxylated alcohol, preferably a $C_{8-18}$ alkyl ethoxylated alcohol, preferably the alkyl alkoxylated alcohol has an average degree of alkoxylation of from 1 to 50, preferably from 1 to 30, or from 1 to 20, or from 1 to 10, preferably the alkyl alkoxylated alcohol is a $C_{8-18}$ alkyl ethoxylated alcohol having an average degree of ethoxylation of from 1 to 10, preferably from 1 to 7, more preferably from 1 to 5 and most preferably from 3 to 7. The alkyl alkoxylated alcohol can be linear or branched and substituted or un-substituted. Suitable nonionic surfactants include those with the trade name Lutensol® from BASF.

Cationic detersive surfactant: Suitable cationic detersive surfactants include alkyl pyridinium compounds, alkyl quaternary ammonium compounds, alkyl quaternary phosphonium compounds, alkyl ternary sulphonium compounds, and mixtures thereof.

Preferred cationic detersive surfactants are quaternary ammonium compounds having the general formula:

$$(R)(R_1)(R_2)(R_3)N^+X^-$$

wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, preferred anions include: halides, preferably chloride; sulphate; and sulphonate.

Amphoteric and Zwitterionic detersive surfactant: Suitable amphoteric or zwitterionic detersive surfactants include amine oxides, and/or betaines. Preferred amine oxides are alkyl dimethyl amine oxide or alkyl amido propyl dimethyl amine oxide, more preferably alkyl dimethyl amine oxide and especially coco dimethyl amino oxide. Amine oxide may have a linear or mid-branched alkyl moiety. Typical linear amine oxides include water-soluble amine oxides containing one R1 C8-18 alkyl moiety and 2 R2 and R3 moieties selected from the group consisting of C1-3 alkyl groups and C1-3 hydroxyalkyl groups. Preferably amine oxide is characterized by the formula R1-N(R2)(R3)O wherein R1 is a C8-18 alkyl and R2 and R3 are selected from the group consisting of methyl, ethyl, propyl, isopropyl, 2-hydroxethyl, 2-hydroxypropyl and 3-hydroxypropyl. The linear amine oxide surfactants in particular may include linear C10-C18 alkyl dimethyl amine oxides and linear C8-C12 alkoxy ethyl dihydroxy ethyl amine oxides.

Other suitable surfactants include betaines, such as alkyl betaines, alkylamidobetaine, amidazoliniumbetaine, sulfobetaine (INCI Sultaines) as well as Phosphobetaines Other suitable surfactants include Tween 20.

Antimicrobial Compounds

In embodiments, soluble active agent can include an effective amount of a compound for reducing the number of viable microbes in the air or on inanimate surfaces. Antimicrobial compounds are effective on gram negative or gram positive bacteria or fungi typically found on indoor surfaces that have contacted human skin or pets such as couches, pillows, pet bedding, and carpets. Such microbial species include *Klebsiella pneumoniae, Staphylococcus aureus, Aspergillus niger, Klebsiella pneumoniae, Steptococcus pyogenes, Salmonella choleraesuis, Escherichia coli, Trichophyton mentagrophytes*, and *Pseudomonoas aeruginosa*. The antimicrobial compounds may also be effective at reducing the number of viable viruses such H1-N1, Rhinovirus, Respiratory Syncytial, Poliovirus Type 1, Rotavirus, Influenza A, Herpes simplex types 1 & 2, Hepatitis A, and Human Coronavirus.

Antimicrobial compounds suitable in the rheological solid composition can be any organic material which will not cause damage to fabric appearance (e.g., discoloration, coloration such as yellowing, bleaching). Water-soluble antimicrobial compounds include organic sulfur compounds, halogenated compounds, cyclic organic nitrogen compounds, low molecular weight aldehydes, quaternary compounds, dehydroacetic acid, phenyl and phenoxy compounds, or mixtures thereof.

A quaternary compound may be used. Examples of commercially available quaternary compounds suitable for use in the rheological solid composition are Barquat available from Lonza Corporation; and didecyl dimethyl ammonium chloride quat under the trade name Bardac® 2250 from Lonza Corporation.

The antimicrobial compound may be present in an amount from about 500 ppm to about 7000 ppm, alternatively about 1000 ppm to about 5000 ppm, alternatively about 1000 ppm to about 3000 ppm, alternatively about 1400 ppm to about 2500 ppm, by weight of the rheological solid composition.

Preservatives

In embodiments, soluble active agent can include a preservative. The preservative may be present in an amount sufficient to prevent spoilage or prevent growth of inadvertently added microorganisms for a specific period of time, but not sufficient enough to contribute to the odor neutralizing performance of the rheological solid composition. In other words, the preservative is not being used as the antimicrobial compound to kill microorganisms on the surface onto which the rheological solid composition is deposited in order to eliminate odors produced by microorganisms. Instead, it is being used to prevent spoilage of the rheological solid composition in order to increase the shelf-life of the rheological solid composition.

The preservative can be any organic preservative material which will not cause damage to fabric appearance, e.g., discoloration, coloration, bleaching. Suitable water-soluble preservatives include organic sulfur compounds, halogenated compounds, cyclic organic nitrogen compounds, low molecular weight aldehydes, parabens, propane diol materials, isothiazolinones, quaternary compounds, benzoates, low molecular weight alcohols, dehydroacetic acid, phenyl and phenoxy compounds, or mixtures thereof.

Non-limiting examples of commercially available water-soluble preservatives include a mixture of about 77% 5-chloro-2-methyl-4-isothiazolin-3-one and about 23% 2-methyl-4-isothiazolin-3-one, a broad spectrum preservative available as a 1.5% aqueous solution under the trade name Kathon® CG by Rohm and Haas Co.; 5-bromo-5-nitro-1,3-dioxane, available under the tradename Bronidox L® from Henkel; 2-bromo-2-nitropropane-1,3-diol, available under the trade name Bronopol® from Inolex; 1,1'-hexamethylene bis(5-(p-chlorophenyl)biguanide), commonly known as chlorhexidine, and its salts, e.g., with acetic and digluconic acids; a 95:5 mixture of 1,3-bis(hydroxymethyl)-5,5-dimethyl-2,4-imidazolidinedione and 3-butyl-2-iodopropynyl carbamate, available under the trade name Glydant Plus® from Lonza; N-[1,3-bis(hydroxymethyl)2,5-dioxo-4-imidazolidinyl]-N,N'-bis(hydroxy-methyl) urea, commonly known as diazolidinyl urea, available under the trade name German® II from Sutton Laboratories, Inc.; N,N"-methylenebis{N'-[1-(hydroxymethyl)-2,5-dioxo-4-imidazolidinyl]urea}, commonly known as imidazolidinyl urea, available, e.g., under the trade name Abiol® from 3V-Sigma, Unicide U-13® from Induchem, Germall 115® from Sutton Laboratories, Inc.; polymethoxy bicyclic oxazolidine, available under the trade name Nuosept® C from Hülls America; formaldehyde; glutaraldehyde; polyaminopropyl biguanide, available under the trade name Cosmocil CQ® from ICI Americas, Inc., or under the trade name Mikrokill® from Brooks, Inc; dehydroacetic acid; and benzothiazolinone available under the trade name Koralone™ B-119 from Rohm and Hass Corporation; 1,2-Benzisothiazolin-3-one; Acticide MBS; Kathon CG/ICP.

Suitable levels of preservative are from about 0.0001 wt. % to about 0.5 wt. %, alternatively from about 0.0002 wt. % to about 0.2 wt. %, alternatively from about 0.0003 wt. % to about 0.1 wt. %, by weight of the rheological solid composition.

Adjuvants

Adjuvants can be added to the rheological solid composition herein for their known purposes. Such adjuvants include, but are not limited to, water soluble metallic salts, including zinc salts, copper salts, and mixtures thereof; antistatic agents; insect and moth repelling agents; colorants; antioxidants; aromatherapy agents and mixtures thereof.

The compositions of the present invention can also comprise any additive usually used in the field under consideration. For example, non-encapsulated pigments, film forming agents, dispersants, antioxidants, essential oils, preserving agents, fragrances, liposoluble polymers that are dispersible in the medium, fillers, neutralizing agents, silicone elastomers, cosmetic and dermatological oil-soluble active agents such as, for example, emollients, moisturizers, vitamins, anti-wrinkle agents, essential fatty acids, sunscreens, and mixtures thereof can be added.

Solvents

The composition can contain a solvent. Non-limiting examples of solvents can include ethanol, glycerol, propylene glycol, polyethylene glycol 400, polyethylene glycol 200, and mixtures thereof. In one example the composition comprises from about 0.5% to about 15% solvent, in another example from about 1.0% to about 10% solvent, and in another example from about 1.0% to about 8.0% solvent, and in another example from about 1% solvent to about 5% solvent. Suitable solvents also include Dowanol PNB-TR and DiPhB.

Vitamins

As used herein, "xanthine compound" means one or more xanthines, derivatives thereof, and mixtures thereof. Xanthine Compounds that can be useful herein include, but are not limited to, caffeine, xanthine, 1-methyl xanthine, theophylline, theobromine, derivatives thereof, and mixtures thereof. Among these compounds, caffeine is preferred in view of its solubility in the composition. The composition can contain from about 0.05%, preferably from about 2.0%, more preferably from about 0.1%, still more preferably from about 1.0%, and to about 0.2%, preferably to about 1.0%, more preferably to about 0.3% by weight of a xanthine compound As used herein, "vitamin B3 compound" means a one or more compounds having the formula:

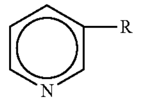

wherein R is —$CONH_2$ niacinamide), —COOH (i.e., nicotinic acid) or —$CH_2OH$ nicotinyl alcohol); derivatives thereof; mixtures thereof; and salts of any of the foregoing.

Exemplary derivatives of the foregoing vitamin B3 compounds include nicotinic acid esters, including non-vasodilating esters of nicotinic acid (e.g, tocopherol nicotinate, and myristyl nicotinate), nicotinyl amino acids, nicotinyl alcohol esters of carboxylic acids, nicotinic acid N-oxide and niacinamide N-oxide. The composition can contain from about 0.05%, preferably from about 2.0%, more preferably from about 0.1%, still more preferably from about 1.0%, and to about 0.1%, preferably to about 0.5%, more preferably to about 0.3% by weight of a vitamin B3 compound.

As used herein, the term "panthenol compound" is broad enough to include panthenol, one or more pantothenic acid derivatives, and mixtures thereof, panthenol and its derivatives can include D-panthenol ([R]-2,4-dihydroxy-N-[3-hydroxypropyl)]-3,3-dimethylbutamide), DL-panthenol, pantothenic acids and their salts, preferably the calcium salt, panthenyl triacetate, royal jelly, pantethine, pantotheine, panthenyl ethyl ether, pangamic acid, pantoynactose, vitamin B complex, or mixtures thereof. The composition can contain from about 0.01%, preferably from about 0.02%, more preferably from about 0.05%, and to about 3%, preferably to about 1%, more preferably to about 0.5% by weight of a panthenol compound Sodium chloride (and other sodium salts) is a particular useful additive to the aqueous phase to adjust the thermal stability of compositions, but must be added into the composition with particular care (Example 3). Not wishing to be bound by theory, sodium chloride is thought to 'salt out' inventive crystallizing agents decreasing their solubility. This has the effect of increasing the thermal stability temperature of the rheological solid composition as measured by the THERMAL STABILITY TEST METHOD. For example, Optimal Chain Length crystallizing agents can have the thermal stability temperatures increased as much as 15° C. with sodium chloride addition. This is particularly valuable as the addition of other ingredients into the aqueous phase often lower the thermal stability temperature in the absence of sodium chloride. Surprisingly, adding sodium chloride can lead to adverse effects in the preparation of the rheological solid compositions. It is preferable in most making processes, to add sodium chloride into the hot crystallizing agent aqueous phase before cooling to form the mesh. However, adding too much may cause 'curding' of the crystallizing agents and absolutely horrid compositions. The sodium chloride may also be added after the formation of the mesh, to provide the benefit of raising the thermal stability temperature at higher levels without curding. Finally, while the thermal stability temperature is increased with addition of sodium chloride, the addition of other non-sodium salts changes the fibrous nature of the crystals formed from the crystallizing agents, to form plates or platelet crystals, which are not rheological solids.

Cleaning Emulsifiers

Compositions are often enhanced by the inclusion of emulsification aids that provide proper emulsification characteristics to remove soils without redeposition. Non limiting examples include Styleze-70, PEG8000 and Propyl Glycol Phenyl Ether. The preferred levels are between about 0.01 wt % and 1.0 w %.

Soil Capture Polymers

Compositions are often enhanced by the inclusion of soil capture polymers that aggregate to aid removal of soils from surfaces. Non limiting examples includes Mirapol HSC-300. The preferred levels are between about 0.01 wt % and 1.0 w %.

Anti-Foaming Agents

Compositions often require the inclusion of anti-foaming agents to prevent or minimize foaming during cleaning. None limiting agents include DC1410. The preferred levels are between about 0.01 wt % and 1.0 w %.

Rheological Solid Composition Properties

Stability Temperature

Stability temperature, as used herein, is the temperature at which most or all of the crystallizing agent completely dissolves into an aqueous phase, such that a composition no longer exhibits a stable solid structure and may be considered a liquid. In embodiments of the present invention the stability temperature range may be from about 40° C. to about 95° C., about 40° C. to about 90° C., about 50° C. to about 80° C., or from about 60° C. to about 70° C., as these temperatures are typical in a supply chain. Stability temperature can be determined using the THERMAL STABILITY TEST METHOD, as described below.

Firmness

Depending on the intended application, such as a stick, firmness of the composition may also be considered. The firmness of a composition may, for example, be expressed in Newtons of force. For example, compositions of the present invention comprising 1-3 wt % crystallizing agent may give values of about 4-about 12 N, in the form of a solid stick or coating on a sheet. As is evident, the firmness of the composition according to embodiments of the present invention may, for example, be such that the composition is advantageously self-supporting and can release liquids and/or actives upon application of low to moderate force, for example upon contact with a surface, to form a satisfactory deposit on a surface, such as the skin and/or superficial body growths, such as keratinous fibers. In addition, this hardness may impart good impact strength to the inventive compositions, which may be molded or cast, for example, into stick or sheet form, such as a wipe or dryer sheet product. The composition of the invention may also be transparent or clear, including for example, a composition without pigments. Preferred firmness is between about 0.1 N to about 50.0 N, more preferably between about 0.5 N to about 40.0 N, more preferably between about 1.0 N to about 30.0 N and most preferably between about 2.5 N to about 15.0 N. The firmness may be measured using the FIRMNESS TEST METHOD, as described below.

Aqueous Phase Expression

Depending on the intended application, such as a stick, aqueous phase expression of the composition may also be considered. This is a measure of the amount of work need per unit volume to express the aqueous phase from the compositions, with larger values meaning it becomes more difficult to express liquid. A low value might be preferred, for example, when applying the composition to the skin. A high value might be preferred, for example, when the composition is applied to a substrate that requires 'dry-to-the-touch-but-wet-to-the-wipe' properties. Preferred values are between about 100 J m-3 to about 8,000 J m-3, more preferably between about 1,000 J m-3 to about 7,000 J m-3, and most preferably between about 2,000 J m-3 to about 5,000 J m-3. The liquid expression may be measured using the AQUEOUS PHASE EXPRESSION TEST METHOD, as described herein.

Firmness Test Method

All samples and procedures are maintained at room temperature (25±3° C.) prior to and during testing, with care to ensure little or no water loss.

All measurements were made with a TA-XT2 Texture Analyzer (Texture Technology Corporation, Scarsdale, N.Y., U.S.A.) outfitted with a standard 45° angle penetration cone tool (Texture Technology Corp., as part number TA-15).

To operate the TA-XT2 Texture Analyzer, the tool is attached to the probe carrier arm and cleaned with a low-lint wipe. The sample is positioned and held firmly such that the tool will contact a representative region of the sample. The tool is reset to be about 1 cm above the product sample.

The sample is re-position so that the tool will contact a second representative region of the sample. A run is done by moving the tool at a rate of 2 mm/second exactly 10 mm into the sample. The "RUN" button on the Texture Analyzer can be pressed to perform the measurement. A second run is done with the same procedure at another representative region of the sample at sufficient distance from previous measurements that they do not affect the second run. A third run is done with the same procedure at another representative region of the sample at sufficient distance from previous measurements that they do not affect the third run.

The results of the FIRMNESS TEST METHOD, are all entered in the examples in the row entitles 'Firmness'. In general, the numeric value is returned as the average of the maximum value of three measurements as described above, except in one of the two cases:

1) the composition does not form a homogenous rheological solid (e.g. completely or partially liquid), the value of 'NM1' is returned;
2) and, the composition curds during making, the value of 'NM2' is returned.

Thermal Stability Test Method

All samples and procedures are maintained at room temperature (25±3° C.) prior to testing.

Sampling is done at a representative region on the sample, in two steps. First, a spatula is cleaned with a laboratory wipe and a small amount of the sample is removed and discarded from the top of the sample at the region, to create a small square hole about 5 mm deep. Second, the spatula is cleaned again with a clean laboratory wipe, and a small amount of sample is collected from the square hole and loaded into DSC pan.

The sample is loaded into a DSC pan. All measurements are done in a high-volume-stainless-steel pan set (TA part #900825.902). The pan, lid and gasket are weighed and tared on a Mettler Toledo MT5 analytical microbalance (or equivalent; Mettler Toledo, LLC., Columbus, OH). The sample is loaded into the pan with a target weight of 20 mg (+/−10 mg) in accordance with manufacturer's specifications, taking care to ensure that the sample is in contact with the bottom of the pan. The pan is then sealed with a TA High Volume Die Set (TA part #901608.905). The final assembly is measured to obtain the sample weight.

The sample is loaded into TA Q Series DSC (TA Instruments, New Castle, DE) in accordance with the manufacture instructions. The DSC procedure uses the following settings: 1) equilibrate at 25° C.; 2) mark end of cycle 1; 3) ramp 1.00° C./min to 90.00° C.; 4) mark end of cycle 3; then 5) end of method; Hit run.

The results of the TEMPERATURE STABILITY TEST METHOD, are all entered in the examples in the row entitles 'Temperature'. In general, the numeric value is returned as described above, except in one of the two cases:

1) the composition does not form a homogenous rheological solid (e.g. completely or partially liquid) and is not suitable for the measurement, the value of 'NM3' is returned;
2) and, the composition curds during making and is not suitable for the measurement, the value of 'NM4' is returned.

Aqueous Phase (AP) Expression Test Method

All samples and procedures are maintained at room temperature 25 (±3° C.) prior to testing.

Measurements for the determination of aqueous phase expression were made with a TA Discovery HR-2 Hybrid Rheometer (TA Instruments, New Castle, DE) and accompanying TRIOS software version 3.2.0.3877, or equivalent. The instrument is outfitted with a DHR Immobilization Cell (TA Instrument) and 55 mm flat steel plate (TA Instruments). The calibration is done in accordance with manufacturer's recommendations, with special attention to measuring the bottom of the DHR Immobilization Cell, to ensure this is established as gap=0.

Samples are prepared in accordance with EXAMPLE procedures. It is critical that the sample be prepared in Speed Mixer containers (Flak-Tech, Max 60 Cup Translucent, Cat #501 222t), so that the diameter of the sample matches the diameter of the HR-2 Immobilization Cell. The sample is released from the containers by running a thin spatula between the edge of the container and the sample. The container is gently turned over and placed on a flat surface. A gentle force is applied to the center of the bottom of the overturned container, until the sample releases and gently glides out of the container. The sample is carefully placed in the center ring of the DHR Immobilization Cell. Care is used to ensure that the sample is not deformed and re-shaped through this entire process. The diameter of the sample should be slightly smaller than the inner diameter of the ring. This ensures that force applied to the sample in latter steps does not significantly deform the cylindrical shape of the sample, instead allowing the aqueous phase to escape through the bottom of the sample. This also ensures that any change in the height of the sample for the experiment is equivalent to the amount of aqueous phase expressed during the test. At the end of the measurement, one should confirm that the aqueous phase is indeed expressed from the sample through the measurement, by looking for aqueous phase in the effluent tube connected to the Immobilization Cell. If no aqueous phase is observed, the sample is deemed not to express aqueous phase and is not inventive.

Set the instrument settings as follows. Select Axial Test Geometry. Then, set "Geometry" options: Diameter=50 mm; Gap=45000 um; Loading Gap=45000 um; Trim Gap Offset=50 um; Material='Steel'; Environmental System="Peltier Plate". Set "Procedure" options: Temperature=25° C.; Soak Time=0 sec; Duration=2000 sec; Motor Direction="Compression"; Constant Linear Rate=2 um sec- 1; Maximum Gap Change=0 um; Torque=0 uN·m; Data Acquisition='save image' every 5 sec.

Manually move the steel tool within about 1000 um of the surface of the sample, taking care that the tool does not touch the surface. In the "Geometry" options, reset Gap to this distance.

Start the run.

The data is expressed in two plots:

1) Plot 1: Axial Force (N) on the left-y-axis and Step Time (s) on the x-axis;
2) Plot 2: Gap (um) on the right-y-axis and Step Time (s) on the x-axis.

The Contact Time—T (contact), is obtained from Plot 1. The T (contact) is defined as the time when the tool touches the top of the sample. The T (contact) is the Step Time when the first Axial Force data point exceeds 0.05 N.

The Sample Thickness—L, is the gap distance at the Contact Time, and expressed in units of meters.

The Time of Compression—T (compression), is the Step Time at which the gap is 0.85*L, or 15% of the sample.

The Work required to squeeze the aqueous phase from the structure is the area under the Axial Force curve in Plot 1 between T (contact) and T (compression) multiplied by Constant Linear Rate, or 2e-6 m s-1 normalized by dividing the total volume of expressed fluids, and is expressed in units of Joules per cubic meter (J m-3).

The results of the AQUEOUS PHASE EXPRESSION TEST METHOD are all entered in the examples in the row entitled 'AP Expression'. In general, the numeric value, as the average of at least two values is returned as described, except in one of the three cases:

1) the composition does not form a homogenous rheological solid (e.g., completely or partially liquid) and is not suitable for the measurement, the value of 'NM5' is returned;
2) the composition curds during making and is not suitable for the measurement, the value of 'NM6' is returned;
3) the composition is a rheological solid but too soft to effectively load in the device, the value of 'NM7' is returned;
4) and the composition is too hard so that the force exceeds 50 N before the 15% compression, the value of 'NM8' is returned;

Blend Test Method

All samples and procedures are maintained at room temperature 25 (±3° C.) prior to testing.

Samples are prepared by weighing 4 mg (+/−1 mg) of a 3% fatty acid in water solution into a scintillation vial with a PTFE septum and then adding 2 mL of ethanol ACS grade or equivalent. A cap is then placed on the vial and the sample is mixed until the sample is homogenous. The vial is then placed in a 70° C. oven with the cap removed to evaporate the ethanol (and water), after which it is allowed to cool to room temperature.

A pipettor is used to dispense 2 mL of BF3-methanol (10% Boron Trifluoride in methanol, Sigma Aldrich #15716) into the vial, and the capped tightly. The sample is placed on a VWR hot plate set at 70° C. until the sample is homogenous, and then for an additional 5 min before cooling to room temperature.

A saturated sodium chloride solution is prepared by adding sodium chloride salt ACS grade or equivalent to 10 mL of distilled water at ambient temperature. Once the vial is at room temperature, 4 mL of the saturated sodium chloride solution are added to the vial and swirled to mix. Then, 4 mL of hexane, ACS grade or equivalent, are added to the vial which is then capped and shaken vigorously. The sample is then placed on a stationary lab bench and until the hexane and water separate into two phases.

A transfer pipet is used to transfer the hexane layer into a new 8 mL vial, and then 0.5 g of sodium sulfate, ACS grade or equivalent, is added to dry the hexane layer. The dried hexane layer is then transferred to a 1.8 mL GC vial for analysis.

Samples are analyzed using an Agilent 7890B (Agilent Technologies Inc., Santa Carla, CA), or equivalent gas chromatograph, equipped with capillary inlet system and flame ionization detector with peak integration capabilities, and an Agilent DB-FastFAME (#G3903-63011), or equivalent column.

The gas chromatograph conditions and settings are defined as follows: uses Helium UHP grade, or regular grade helium purified through gas purification system, as a carrier gas, and is set at a constant flow mode of 1.2 mL/minute (velocity of 31.8 cm/sec); has an oven temperature program that is set for 100° C. for 2 minutes, and increased at a rate of 10° C. per minute until it reaches 250 C for 3 minutes; the injector temperature is set to 250° C. and the detector temperature is set to 280° C.; the gas flows are set to 40 mL/minute for hydrogen, 400 mL/minute for air, and 25 mL/minute for the Make-up (helium); and the injection volume and split ratio is defined a 1 uL, split 1:100 injection.

The instrument is calibrated using a 37-Component FAME standard mixture (Supelco #CRM47885), or equivalent calibration standard. The Response Factor and Normalized Response Factor based on n-C16 FAME standard.

Response Factor is calculated for each component by dividing the FAME FID Area account of an analyte in the calibration solution by the concentration of the identical FAME analyte in the calibration solution.

The Normalized Response Factor is calculated by dividing the Response Factor of each component by the Response Factor of n-C16 methyl ester that has been defined as 1.00.

The Normalized FAME FID Area is calculated with the Normalized Response Factor by dividing the FAME FID area (component) by the Normalized Response Factor (component).

The FAME weight percent of each component is calculated by dividing the Normalized FAME FID area (component) by the Normalized FAME FID area (total of each component) and then multiplying by one hundred.

The Conversion Factor from FAME to free Fatty Acid is calculated by dividing the Molecular Weight of the Target Fatty Acid by the Molecular Weight of the Target FAME.

The Normalized Fatty Acid FID Area is calculated by multiplying the Normalized FAME FID Area by the Conversion Factor from FAME to free Fatty Acid.

The Fatty Acid Weight Percent of each component is calculated by dividing the Normalized Fatty Acid FID Area (component) by the Normalized FA FID Area (total of each component) and the multiplying the result by one hundred.

The Conversion Factor from FAME to free Fatty Acid Sodium Salt is calculated by dividing the Molecular Weight of the Target Fatty Acid Sodium Salt by the molecular weight of the Target FAME.

The Normalized Fatty Acid Sodium Salt FID Area is calculated by multiplying the Normalized FAME FID Area by the Conversion Factor from FAME to free Fatty Acid Sodium Salt.

The Weight percent of each Fatty Acid Sodium Salt component was calculated by dividing the normalized Fatty Acid Sodium Salt FID area (component) by the Normalized Fatty Acid Sodium Salt FID area (total of each component) and then multiplying by one hundred.

Purity of the crystallizing agent is described in the following ways:

Optimal Purity—Po, which is the mass fraction of the optimal chain length molecules in the crystallizing agent blend calculated as:

$$Po = \frac{\sum Mo}{Mt}$$

where Mo is the mass of each optimal chain length in the crystallizing agent and Mt is the total mass of the crystallizing agent.

Single Purity—Ps, which is the mass fraction of the most common chain length in the crystallizing agent blend calculated as:

$$Ps = \frac{Ms}{Mt}$$

where Ms is the mass of the most common chain length in the crystallizing agent and Mt is the total mass of the crystallizing agent. The value is expressed in brackets—[Ms], if the most common chain length is selected from the group of unsuitable chain length molecules.

EXAMPLES

Materials List (1) Water: Millipore, Burlington, MA (18 m-ohm resistance)
(2) Sodium caprate (sodium decanoate, NaC10): TCI Chemicals, Cat #D0024
(3) Sodium laurate (sodium dodecanoate, NaC12): TCI Chemicals, Cat #D0024
(4) Sodium myristate (sodium tetradecanoate, NaC14): TCI Chemicals, Cat. #M0483
(5) Sodium palmitate (sodium hexadecanoate, NaC16): TCI Chemicals, Cat. #P0007
(6) Sodium stearate (sodium octadecanoate, NaC18): TCI Chemicals, Cat. #S0081
(7) Sodium oleate (sodium trans-9-octadecanoate, NaC18:1): TCI Chemicals, Cat #O0057
(8) Pentadecylic acid (pentadecanoic acid, HC15): TCI Chemicals, Cat #P0035
(9) Margaric acid (heptadecanoic acid, HC17): TCI Chemicals, Cat #H0019
(10) Nonadecylic acid (nonadecanoic acid, HC19): TCI Chemicals, Cat #N0283
(11) C1270 K ID: P&G Chemicals, Cincinnati, OH) prod. code 10275803
(12) C1618 K ID: P&G Chemicals, Cincinnati, OH) prod. code 10275805
(13) C1218 K ID: P&G Chemicals, Cincinnati, OH) prod. code 10275798
(14) C1214 K ID: P&G Chemicals, Cincinnati, OH) prod. code 10275796
(15) NaOH: 0.10 M, Fluka Chemical, Cat #319481-500ML
(16) Sodium chloride (NaCl): VWR, Cat #BDH9286-500G
(17) Lauric acid (HL): TCI Chemicals, Cat #L0011
(18) NaOH: 1.0 N, Honeywell/Fluka, Cat #35256-1L
(19) Mirapol HSC-300 (Solvay, Princeton NJ)
(20) Amine Oxide (Procter & Gamble Company, Cincinnati, OH, Cat #AO-1214-Lp)
(21) Uniquat 2250 (Lonza, Morristown, NJ)
(22) Bardac 2250 (Lonza, Morristown, NJ)
(23) Dowanol PNB-TR (Sigma Aldrich, St. Louis, MO, Cat #484415)
(24) Propylene Glycol Phenyl Ether (Sigma Aldrich, St. Louis, MO, Cat #484423)
(25) DiPnB (Sigma Aldrich, St. Louis, MO, Cat #388130)
(26) DC1410 (The Dow Chemical Company, Midland, MI, Cat #Xiameter AFE-1410)
(27) Kathon (Supreme Resources, Inc., Suwanee, GA)
(28) Perfume (FIF Sunkissed NS-2, Procter & Gamble Company, Cincinnati, OH)
(29) Tween 20 (Croda, Edison, NJ)
(30) Styleze C-10 (Ashland Chemical Company, Columbus, OH)
(31) PEG 8000 (Fisher Scientific, Fair Lawn, NJ)
(32) NatPure Cellgum Plus (South Plainfield, NJ)
(33) Crystallizing Fluid (Swiffer WetJet Multi-Purpose Floor Cleaner Solution with Febreze, Lavender Vanilla and Comfort Scent)

Example 1

These include samples containing crystallizing agents with a Po value of about 1 and Ps value of also about 1, as determined by the BLEND TEST METHOD, contrasting optimal and unsuitable crystallizing agents. Sample A-E (Tables 1-2) show samples prepared with different weight percentage of sodium tetradecanoate. The increasing concentrations increase both firmness and temperature stability of the samples, but also make it more difficult to express aqueous phase, as reflected in the aqueous phase expression value. As Example E shows—at about 9 wt %, it is no longer practical to express aqueous phase, as has been observed with soap bars that use these materials as gelling agents. Sample F-H (Table 2), show that other optimal chain length crystallizing agents, share similar trends as the previous examples. Sample I-K (Table 3) have unsuitable crystallizing agents, and the sample compositions result in liquids. Not wishing to be bound by theory, it is believed these crystallizing agents are either too soluble (e.g., low Krafft Temperature) or 'kinks' from unsaturation in the chains disrupts crystallization. Sample L-N (Table 4) demonstrate that it is possible to create compositions with odd-chain length crystallizing agents. It is believed odd-chain-length crystallizing agents crystallize in a different manner than even chain-length crystallizing agents, so that it is surprising these compositions still form effective mesh structures.

Preparation of Compositions

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

Sample A-K were prepared by first adding Water (1) and crystallizing agent (2-7) to the beaker. The beaker was placed on the heating-pad assembly. The overhead stirrer was placed in the beaker and set to rotate at 100 rpm. The heater was set at 80° C. The preparation was heated to 80° C. The solution was then divided into three 60 g plastic jars (Flak-Tech, Max 60 Cup Translucent, Cat #501 222t): one jar was filled to 50 ml and two jars filled to 25 ml (Sample A-H). The samples were cooled at room temperature 25 (±3° C.) until solid. Firmness measurements were made on the 50 ml sample with the FIRMNESS TEST METHOD and a thermal stability measurement was made by the THERMAL STABILITY TEST METHOD on the 50 ml sample. Water-expression measurements were made by the AQUEOUS PHASE EXPRESSION TEST METHOD on the two 25 ml samples. Representative data demonstrates that the prototypes exhibit the required properties for these rheological solid compositions.

Sample L-N were prepared by first adding NaOH (15) and fatty acid (8-10) to the beaker. The amount of NaOH was determined by acid number (AOCS Official Method Db 3-48-Free Acids or Free Alkali in Soap and Soap Products). The beaker was placed on the heating-pad assembly. The overhead stirrer was placed in the beaker and set to rotate at 100 rpm. The heater was set at 80° C. The preparation was heated to 80° C. The solution was then divided into three 60 g plastic jars (Flak-Tech, Max 60 Cup Translucent, Cat #501 222t): one jar was filled to 50 ml and two jars filled to 25 ml. The samples were cooled at room temperature 25 (±3° C.) until solid. Firmness measurements were made on the 50 ml sample with the FIRMNESS TEST METHOD and a thermal stability measurement was made by the THERMAL STABILITY TEST METHOD on the 50 ml sample. Water-expression measurements were made by the AQUEOUS PHASE EXPRESSION TEST METHOD on the two 25 ml samples and blend was determined from the BLEND TEST METHOD. Representative data demonstrates that the prototypes exhibit the required properties of firmness, aqueous phase expression and thermal stability for these rheological solid compositions.

TABLE 1

| | Sample A Inventive | Sample B Inventive | Sample C Inventive | Sample D Inventive |
|---|---|---|---|---|
| (1) Water | 99.501 g | 99.001 g | 97.001 g | 95.001 g |
| (2) NaC10 | — | — | — | — |
| (3) NaC12 | — | — | — | — |
| (4) NaC14 | 0.500 g | 1.003 g | 3.001 g | 5.003 g |
| (5) NaC16 | — | — | — | — |
| (6) NaC18 | — | — | — | — |
| (7) NaC18:1 | — | — | — | — |
| % Crystallizing Agent | 0.5 wt % | 1.0 wt % | 3.0 wt % | 5.0 wt % |
| Firmness | 0.51 N | 1.24 N | 8.65 N | 14.31 N |
| AP Expression | NM7 | 340 J m-3 | 6,260 J m-3 | 7,730 J m-3 |
| Temperature | 46.7° C. | 45.0° C. | 48.5° C. | 54.3° C. |
| Po | 1.00 | 1.00 | 1.00 | 1.00 |
| Ps | 1.00 | 1.00 | 1.00 | 1.00 |

TABLE 2

| | Sample E Comparative | Sample F Inventive | Sample G Inventive | Sample H Inventive |
|---|---|---|---|---|
| (1) Water | 91.000 g | 99.501 g | 93.002 g | 93.002 g |
| (2) NaC10 | | — | — | — |
| (3) NaC12 | — | — | — | — |
| (4) NaC14 | 9.000 g | — | — | — |
| (5) NaC16 | — | 0.500 g | 7.002 g | — |
| (6) NaC18 | — | — | — | 7.000 g |
| (7) NaC18:1 | — | — | — | — |
| % Crystallizing Agent | 9.0 wt % | 0.5 wt % | 7.0 wt % | 7.0 wt % |
| Firmness | 40.92 N | 0.51 N | 5.03 N | 4.19 N |
| AP Expression | NM8 | NM7 | 2,550 J m-3 | 4,230 J m-3 |

TABLE 2-continued

| | Sample E Comparative | Sample F Inventive | Sample G Inventive | Sample H Inventive |
|---|---|---|---|---|
| Temperature | 56.4° C. | 59.0° C. | 64.3° C. | 78.0° C. |
| Po | 1.00 | 1.00 | 1.00 | 1.00 |
| Ps | 1.00 | 1.00 | 1.00 | 1.00 |

TABLE 3

| | Sample I Comparative | Sample J Comparative | Sample K Comparative |
|---|---|---|---|
| (1) Water | 48.500 g | 48.611 g | 48.740 g |
| (2) NaC10 | 1.500 g | — | — |
| (3) NaC12 | — | 1.547 g | — |
| (4) NaC14 | — | — | — |
| (5) NaC16 | — | — | — |
| (6) NaC18 | — | — | — |
| (7) NaC18:1 | — | — | 1.505 g |
| % Crystallizing Agent | 3.0 wt % | 3.1 wt % | 3.0 wt % |
| Firmness | NM1 | NM1 | NM1 |
| AP Expression | NMS | NMS | NMS |
| Temperature | NM3 | NM3 | NM3 |
| Po | 0.00 | 0.00 | 0.00 |
| Ps | [1.00] | [1.00] | [1.00] |

TABLE 4

| | Sample L Inventive | Sample M Inventive | Sample N Inventive |
|---|---|---|---|
| (8) H C15 | — | 2.561 g | — |
| (9) H C17 | 2.761 g | — | — |
| (10) H C19 | — | — | 3.090 g |
| % Crystallizing Agent | 2.76 wt % | 2.56 wt % | 3.09 wt % |
| (15) NaOH | 97.210 g | 97.442 g | 96.911 g |
| Firmness | 8.10N | 4.49N | 4.77N |
| AP Expression | 6,001 J m-3 | 3,688 J m-3 | 3,327 J m-3 |
| Temperature | 75.2° C. | 63.0° C. | 83.3° C. |
| Po | 1.00 | 1.00 | 1.00 |
| Ps | 1.00 | 1.00 | 1.00 |

Example 2

This example includes compositions that contain blends of crystallizing agent molecules, as determined by the BLEND TEST METHOD, contrasting the effects of the relative amounts of optimal and unsuitable chain length crystallizing agent molecules on the three required properties. Samples O-R (Table 5) show samples prepared using different weight percentages of typical commercial fatty acid mixtures. The header shows the particular crystallizing agent used in the preparation and the 'from analysis' shows the chain length distribution from the BLEND TEST METHOD. All the compositions failed to crystallize and could not be measured for firmness, stability temperature or aqueous phase expression. Not wishing to be bound by theory, it is believed these samples have too high a level of unsuitable crystallizing agents to initiate viable mesh formation. Samples S-V (Table 6) show the effect of adjusting the comparative levels of optimal and unsuitable crystallizing agent chain length in the composition. While the weight percent of the crystallizing agent remains constant in the compositions, the amount of unsuitable chain length (C10) increases, resulting in the production of softer compositions having lower thermal stability temperature that do not crystallize to form a mesh structure. Samples W-Z (Table 7) show the effect of adjusting the comparative levels of optimal and unsuitable crystallizing agent chain length in the composition. While the weight percent of the crystallizing agent remains constant in the compositions, the amount of unsuitable chain length (C10) increases resulting in the production of softer compositions, having lower thermal stability temperature that do not crystallize to form a mesh structure. Surprisingly, the effect of the unsuitable crystallizing agents is more detrimental in combination with the shorter chain length optimal crystallizing agent. Not wishing to be bound by theory, but it is believed that the fibrous crystals are ‘held’ together primarily by chain-to-chain interactions of the crystallizing agents in the crystals and, being fewer with shorter chain length crystallizing agents, are more susceptible to the presence of unsuitable crystallizing agents in the crystals.

Preparation of Compositions

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

Samples O-R were prepared by first adding NaOH (15) and commercial fatty acid (11-14) to the beaker. The amount of NaOH was determined by acid number (AOCS Official Method Db 3-48-Free Acids or Free Alkali in Soap and Soap Products). The beaker was placed on the heating-pad assembly. The overhead stirrer was placed in the beaker and set to rotate at 100 rpm. The heater was set at 80° C. The preparation was heated to 80° C. The solution was then divided into three 60 g plastic jars (Flak-Tech, Max 60 Cup Translucent, Cat #501 222t): one jar was filled to 50 ml and two jars filled to 25 ml. They were cooled at room temperature 25 (±3° C.). These samples remained liquid and consequently were not measured for firmness, thermal stability or water expression. One skilled in art recognizes that cooling compositions of crystallizing agent at different rates may result in modest differences in the firmness, aqueous phase expression and stability temperature properties; this is common in samples prepared at different absolute weights.

Samples S-Z were prepared by first adding Water (1) and crystallizing agent (2-7) to the beaker. The beaker was placed on the heating-pad assembly. The overhead stirrer was placed in the beaker and set to rotate at 100 rpm. The heater was set at 80° C. The preparation was heated to 80° C. The solution was then divided into three 60 g plastic jars (Flak-Tech, Max 60 Cup Translucent, Cat #501 222t): one jar was filled to 50 ml and two jars filled to 25 ml (Examples A-H). The samples were cooled at room temperature 25 (±3° C.) until solid. Firmness measurements were made on the 50 ml sample with the FIRMNESS TEST METHOD and a thermal stability measurement was made by the THERMAL STABILITY TEST METHOD on the 50 ml sample. Aqueous phase expression measurements were made by the AQUEOUS PHASE EXPRESSION TEST METHOD on the two 25 ml samples, in all cases except Example V and Example Z, which remained liquid. The blend was determined from the BLEND TEST METHOD.

One skilled in art recognizes that cooling compositions of crystallizing agent at different rates may result in modest differences in the firmness, aqueous phase expression and stability temperature properties; this is common in samples prepared at different absolute weights.

TABLE 5

| | Sample O (11) C-1270 K Comparative | Sample P (12) C-1618 K Comparative | Sample Q (13) C-1218 K Comparative | Sample R (14) C-1214 K Comparative |
|---|---|---|---|---|
| Wt. Crystallizing Agent | 1.504 g | 1.515 g | 1.509 g | 1.511 g |
| (1) Water | 41.607 g | 43.533 g | 42.195 g | 41.708 g |
| (18) NaOH | 6.963 g | 5.020 g | 6.435 g | 6.843 g |
| % Crystallizing Agent | 3.00 wt % | 3.03 wt % | 3.00 wt % | 3.02 wt % |
| Firmness | NM1 | NM1 | NM1 | NM1 |
| AP Expression | NMS | NMS | NMS | NMS |
| Temperature | NM3 | NM3 | NM3 | NM3 |
| Po | 0.26 | 0.25 | 0.27 | 0.28 |
| Ps | [0.74] | [0.69] | [0.58] | [0.72] |
| (Chain length distribution for each crystallizing agent) | | | | |
| HC8 | — | — | — | — |
| HC10 | — | — | — | — |
| HC12 | 1.113 g | — | 0.875 g | 1.088 g |
| HC13 | — | — | — | — |
| HC14 | 0.391 g | — | 0.287 g | 0.378 g |
| HC15 | — | — | — | — |
| HC16 | — | 0.300 g | 0.121 g | 0.045 g |
| HC17 | — | — | — | — |
| HC18 | — | 0.076 g | 0.226 g | — |
| HC18:1 | — | 1.045 g | — | — |
| Other | — | 0.106 g | — | — |

TABLE 6

| | Sample S Inventive | Sample T Inventive | Sample U Inventive | Sample V Comparative |
|---|---|---|---|---|
| (1) Water | 47.501 g | 47.501 g | 47.500 g | 47.501 g |
| (2) NaC10 | — | 0.500 g | 1.000 g | 2.000 g |
| (3) NaC12 | — | — | — | — |
| (4) NaC14 | 2.500 g | 2.000 g | 1.505g | 0.501 g |
| (5) NaC16 | — | — | — | — |
| (6) NaC18 | — | — | — | — |

TABLE 6-continued

| | Sample S Inventive | Sample T Inventive | Sample U Inventive | Sample V Comparative |
|---|---|---|---|---|
| (7) NaC18:1 | — | — | — | — |
| % Crystallizing Agent | 5.0 wt % | 5.0 wt % | 5.1 wt % | 5.0 wt % |
| Firmness | 16.2N | 13.7N | 11.7N | NM1 |
| AP Expression | 8,107 J m-3 | 8,753 J m-3 | 2,176 J m-3 | NM5 |
| Temperature | 48.6° C. | 44.5° C. | 40.0° C. | NM3 |
| Po | 1.00 | 0.80 | 0.60 | 0.20 |
| Ps | 1.00 | 0.80 | 0.60 | [0.8] |

TABLE 7

| | Sample W Inventive | Sample X Inventive | Sample Y Inventive | Sample Z Comparative |
|---|---|---|---|---|
| (1) Water | 47.502 g | 47.501 g | 47.502 g | 47.500 g |
| (2) NaC10 | — | 0.504 g | 1.500 g | 2.252 g |
| (3) NaC12 | — | — | — | — |
| (4) NaC14 | — | — | — | — |
| (5) NaC16 | — | — | — | — |
| (6) NaC18 | 2.500 g | 2.002 g | 1.003 g | 0.253 g |
| (7) NaC18:1 | — | — | — | — |
| % Crystallizing Agent | 5.0 wt % | 5.0 wt % | 5.0 wt % | 5.0 wt % |
| Firmness | 2.5N | 1.5N | 0.8N | NM1 |
| AP Expression | 4,560 J m−3 | 1,308 J m−3 | — | NM5 |
| Temperature | 73.0° C. | 72.6° C. | 60.6° C. | NM3 |
| Po | 1.00 | 0.80 | 0.60 | 0.10 |
| Ps | 1.00 | 0.80 | [0.60] | [0.90] |

Example 3

This example demonstrates the effect of sodium chloride addition on the thermal stability and firmness of the rheological solid composition. Samples AA-AD (Table 8) show the effect of adding sodium chloride into the hot mixture of crystallizing agent and aqueous phase. Example AA is the control, without sodium chloride addition. Sample AB and Sample AC have increasing amounts of sodium chloride which results in increasing thermal stability temperature, but with a slight decrease in firmness. Surprisingly, Sample AD curds the hot mixture. Not wishing to be bound by theory, but it is believed the sodium chloride is thought to 'salt out' the crystallizing agent so that it becomes soluble only at higher temperature; and also changes the crystallization of the crystallizing agent resulting in slightly softer compositions. However, when the sodium chloride level is too high, the solubility temperature exceeds the processing temperature and the mixtures curd. Once curding has occurred, it can no longer form the crystalline mesh. Samples AE-AG demonstrate a solution to this problem. In these examples, the crystalline mesh is formed first and then the sodium chloride is physically added to the top of the rheological solid composition. In this progression, the sodium chloride concentration increases the thermal stability temperature, while not changing the firmness. Not wishing to be bound by theory, it is believed that the crystalline mesh is formed as in the control Example AA, and that the added sodium chloride diffuses through the composition to change the solubility of the fibrous crystallizing agent, but not the nature of the fibers. Curding is no longer a problem, as the mixtures are crystallized first before the salt addition. This approach provides a more than 20-degree increase in the thermal stability temperature.

Preparation of Compositions

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

Samples AA-AD were prepared by adding Water (1), NaC14 (4) and sodium chloride (16) to the beaker. The beaker was placed on the heating-pad assembly. The overhead stirrer was placed in the beaker and set to rotate at 100 rpm. The heater was set at 80° C. The preparation was heated to 80° C. The solution was then was poured into 60 g plastic jars (Flak-Tech, Max 60 Cup Translucent, Cat #501 222t) and allowed to crystallize at 3° C. (±1° C.) in refrigerator (VWR Refrigerator, Model #SCUCFS-0204G, or equivalent) until solid. Firmness measurements were made with the FIRMNESS TEST METHOD, thermal stability measurement was made by the THERMAL STABILITY TEST METHOD and purity was determined from the BLEND TEST METHOD. Examples AE-AG were prepared by adding Water (1) and NaC14 (4) the beaker. The beaker was placed on the heating-pad assembly. The overhead stirrer was placed in the beaker and set to rotate at 100 rpm. The heater was set at 80° C. The preparation was heated to 80° C. The solution was then was poured into 60 g plastic jars (Flak-Tech, Max 60 Cup Translucent, Cat #501 222t) and allowed to crystallize at 3° C. (±1° C.) in refrigerator (VWR Refrigerator, Model #SCUCFS-0204G, or equivalent) until solid. The sodium chloride (16) was added to the top of the composition and allowed to diffuse through the composition for one week, before measurement. Firmness measurements were made with the FIRMNESS TEST METHOD, thermal stability measurement was made by the THERMAL STABILITY TEST METHOD and purity was determined from the BLEND TEST METHOD. One skilled in art recognizes that cooling compositions of crystallizing agent at different rates may result in modest differences in the firmness, aqueous phase expression and stability temperature properties; this is common in samples prepared at different absolute weights.

TABLE 8

| | Sample AA Inventive | Sample AB Inventive | Sample AC Inventive | Sample AD Comparative |
|---|---|---|---|---|
| (1) Water | 48.531 g | 48.070 g | 47.028 g | 43.742 g |
| (4) NaC14 | 1.519 g | 1.512 g | 1.478 g | 1.358 g |
| % Crystallizing Agent | 3.03 wt % | 3.02 wt % | 2.95 wt % | 2.70 wt % |
| (16) NaCl | — | 0.508 g | 1.524 g | 5.087 g |
| Wt % NaCl | — | 1.0 wt % | 3.0 wt % | 10.1 wt % |
| Firmness | 6.51N | 3.77N | 3.15N | NM2 |
| AP Expression | — | — | — | — |
| Temperature | 54.0° C. | 61.6° C. | 64.7° C. | NM4 |
| Po | 1.00 | 1.00 | 1.00 | 1.00 |
| Ps | 1.00 | 1.00 | 1.00 | 1.00 |

TABLE 9

| | Sample AE Inventive | Sample AF Inventive | Sample AG Inventive |
|---|---|---|---|
| (1) Water | 48.0 g | 47 g | 43.6 g |
| (4) NaC14 | 1.5 g | 1.5 g | 1.35 g |
| % Crystallizing Agent | 3.00 wt % | 3.00 wt % | 2.70 wt % |
| (16) NaCl (post) | 0.5 g | 1.5 g | 5.0 g |
| Wt % NaCl | 1.0 wt % | 3.0 wt % | 10.1 wt % |
| Firmness | 8.47N | 9.31N | 9.53N |
| AP Expression | — | — | — |
| Temperature | 55.5° C. | 61.7° C. | 76.7° C. |
| Po | 1.00 | 1.00 | 1.00 |
| Ps | 1.00 | 1.00 | 1.00 |

Example 4

This example illustrates the difference between inventive samples in this specification relative to bar soap compositions, exemplified by Sample AH. The example fails to meet all three performance criteria. Specifically, the thermal stability temperature of the composition is too low to effectively survive reliably on the shelf life or in the supply chain. Not wishing to be bound by theory, it is believed the chain length of 12 is far too soluble owing to the short chain length (i.e. Sample J) such that—even with a 1 wt % addition of the sodium chloride, the C12 solubilizes below 40° C.

Preparation of Compositions

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

A solution was prepared by adding water (1), sodium chloride (16) and lauric acid (17) to the beaker. The beaker was placed on the heated mixing device. The overhead stirrer was placed in the beaker and set to rotate at 100 rpm. The heater was set and the preparation was heated to 71° C. Sodium hydroxide (15) was then added to the solution to neutralize the fatty acid and the entire mixture was heated to 95° C. The solution was then placed in cooling jars (Flak-Tech, Max 60 Cup Translucent, Cat #501 222t) and set on the bench to cool at room temperature 25 (±3° C.) until solid. Firmness measurements were made with the FIRMNESS TEST METHOD, thermal stability measurement was made by the THERMAL STABILITY TEST METHOD, water expression was made by the AQUEOUS PHASE EXPRESSION TEST METHOD and purity was determined from the BLEND TEST METHOD.

TABLE 10

| | Sample AH Comparative |
|---|---|
| (1) Water | 71.500 g |
| (16) NaCl | 1.002 g |
| (17) HL | 4.506 g (22.5 mmol) |
| (15) NaOH | 22.500 g (563 mmol) |
| % Crystallizing Agent | 5.0 wt % |
| Firmness | 11.43N |
| AP Expression | 2,810 J m−3 |
| Temperature | 35.5° C. |
| Po | 0.00 |
| Ps | [1.00] |

Example 5

Rheological solid compositions assembled with substrate, for control the aqueous phase expression from the cleaning article (Samples AI-AV).

Preparation of Compositions

Compositions in this example were prepared using a heated mixing device. An overhead mixer (IKA Works Inc, Wilmington, NC, model RW20) and a three-blade impeller design was assembled. All preparations were heated on a heating-pad assembly (IKA Works Inc, Model RCT Basic) where heating was controlled with an accompanying probe (IKA Works Inc, Model ETS-D5). All preparations were done in a 600 ml stainless steel beaker (Thermo Fischer Scientific, Waltham, MA).

All ingredients were added in order to the stainless-steel beaker according to the compositions in weight % in the tables below. Batch sizes were typically 250 grams. The beaker was placed on the heated mixing device. The overhead stirrer was placed in the beaker and set to rotate at 200-300 rpm. The heater was set and the preparation was heated to 85° C. Once this target temperature was achieved, the solution was allowed to mix for a minimum of 10 minutes or until the crystallizing agent was fully dissolved. The solution was then placed in cooling jars (Flak-Tech, Max 60 Cup Translucent, Cat #501 222t) and set on the bench to cool at room temperature 25 (±3° C.) until solid. Firmness measurements were made with the FIRMNESS TEST METHOD and thermal stability measurement was made by the THERMAL STABILITY TEST METHOD. Water expression measurements were made on selected samples by the AQUEOUS PHASE EXPRESSION TEST METHOD.

TABLE 11

| Material | Sample AI Inventive | Sample AJ Inventive | Sample AK Inventive | Sample AL Inventive |
|---|---|---|---|---|
| (1) Water | q.s. | q. s | q. s | q. s |
| (4) NaM | — | — | — | — |
| (5) NaP | — | — | — | — |
| (6) NaS | 2.00000% | 2.00000% | 3.00000% | 4.00000% |
| (19) Mirapol HSC-300 | 0.02000% | 0.10000% | 0.02000% | 0.02000% |
| (20) Amine oxide | 0.04000% | 0.04000% | 0.04000% | 0.04000% |
| (28) Perfume | 0.15000% | 0.15000% | 0.15000% | 0.15000% |
| (23) Dowanol PNB-TR | 0.49000% | 0.490000% | 0.49000% | 0.49000% |
| (24) Propylene glycol phenyl ether | 0.20000% | 0.20000% | 0.20000% | 0.20000% |
| (25) DiPnB | 0.20000% | 0.20000% | 0.20000% | 0.20000% |
| (22) Bardac 2250 | — | — | — | — |
| (27) Kathon | 0.00025% | 0.00025% | 0.00025% | 0.00025% |
| (26) DC1410 Antifoam | 0.00090% | 0.00090% | 0.00090% | 0.00090% |
| Firmness | 0.68N | 0.56N | 2.74N | 4.04N |
| AP Expression | 200 J m−3 | — | 980 J m−3 | — |
| Temperature | 58.6° C. | 59.1° C. | 58.1° C. | 62.3° C. |
| Po | 1.00 | 1.00 | 1.00 | 1.00 |
| Ps | 1.00 | 1.00 | 1.00 | 1.00 |

TABLE 12

| Material | Sample AM Inventive | Sample AN Inventive | Sample AO Inventive | Sample AP Inventive |
|---|---|---|---|---|
| (1) Water | q.s. | q.s | q.s | q.s |
| (4) NaM | — | — | — | — |
| (5) NaP | 2.00000% | 2.00000% | 3.00000% | 4.00000% |
| (6) NaS | — | — | — | — |
| (19) Mirapol HSC-300 | 0.02000% | 0.10000% | 0.02000% | 0.02000% |
| (20) Amine oxide | 0.04000% | 0.04000% | 0.04000% | 0.04000% |
| (28) Perfume | 0.15000% | 0.15000% | 0.15000% | 0.15000% |
| (23) Dowanol PNB-TR | 0.49000% | 0.49000% | 0.49000% | 0.49000% |
| (24) Propylene glycol phenyl ether | 0.20000% | 0.20000% | 0.20000% | 0.20000% |
| (25) DiPnB | 0.20000% | 0.20000% | 0.20000% | 0.20000% |
| (22) Bardac 2250 | — | — | — | — |
| (27) Kathon | 0.00025% | 0.00025% | 0.00025% | 0.00025% |
| (26) DC1410 Antifoam | 0.00090% | 0.00090% | 0.00090% | 0.00090% |
| Firmness | 1.04N | 0.73N | 1.82N | 2.58N |
| AP Expression | 356 J m−3 | — | 1,035 J m−3 | — |
| Temperature | 48.9° C. | 49.1° C. | 48.4° C. | 48.4° C. |
| Po | 1.00 | 1.00 | 1.00 | 1.00 |
| Ps | 1.00 | 1.00 | 1.00 | 1.00 |

TABLE 13

| | Sample AQ Inventive | Sample AR Inventive | Sample AS Inventive | Sample AT Inventive | Sample AU Inventive | Sample AV Inventive |
|---|---|---|---|---|---|---|
| (1) Water | q.s. | q.s. | q.s. | q.s. | q.s. | q.s. |
| (4) NaM | — | — | — | — | — | — |
| (5) NaP | — | — | — | — | — | — |
| (6) NaS | 2.5% | 2.5% | 2.5% | 2.0% | 2.5% | 2.5% |
| (19) Mirapol HSC-300 | 0.02% | 0.02% | 0.02% | 0.02% | 0.02% | 0.02% |
| (20) Amine oxide | 0.01% | — | 0.01% | 0.01% | 0.01% | 0.01% |
| (29) Tween 20 | 0.03% | 0.04% | 0.03% | 0.03% | 0.03% | 0.03% |
| (28) Perfume | 0.15% | 0.15% | 0.3% | 0.3% | 0.3% | 0.3% |
| (23) Dowanol PNB-TR | 0.49% | 0.49% | 0.49% | 0.49% | 0.49% | 0.49% |
| (24) Propylene glycol phenyl ether | 0.2% | 0.2% | 0.2% | 0.2% | 0.2% | 0.2% |
| (25) DiPnB | 0.2% | 0.2% | 0.2% | 0.2% | 0.2% | 0.2% |
| (27) Kathon | 0.00025% | 0.00025% | 0.00025% | 0.00025% | 0.00025% | 0.00025% |
| (26) DC1410 | 0.0009% | 0.0009% | 0.0009% | 0.0009% | 0.0009% | 0.0009% |
| (30) Styleze CC-10 | — | — | 0.01% | 0.01% | — | — |
| (31) PEG8000 | — | — | — | — | 0.01% | 0.01% |
| (22) Bardac 2250 | — | — | — | — | — | 0.053% |
| Firmness | 2.01N | 2.26N | 1.30N | 1.30N | 2.10N | 1.55N |
| AP Expression | — | — | 231 J m-3 | — | 2,058 J m-3 | 1,281 J m-3 |
| Temperature | 58.6° C. | 58.7° C. | 57.5° C. | 58.7° C. | 56.9° C. | 61.3° C. |
| Po | 1.00 | 1.00 | 1.00 | 1.00 | 1.00 | 1.00 |
| Ps | 1.00 | 1.00 | 1.00 | 1.00 | 1.00 | 1.00 |

Example 6

Rheological solid compositions assembled with substrate. It is understood in the examples below, the 'crystallizing agent' refer to group of crystallizing agents (4-6) and combinations, thereof. The preferred levels are between about 0.5 wt % and 5.0 w %. In this embodiment, it is further understood in the examples below, the 'cleaning agents' include but are not limited to Mirapol 300, Uniquat 2250, Bardac 2250 and Basophor HCO60 soil capture polymers; further optionally including Dowanol PNB-TR, Propylene Glycol Phenyl Ether and DiPnB cleaning solvents; further optionally including Kathon CG/ICP preservative; further optionally including DC1410 antifoam agents. The preferred levels are between about 0.01 wt % and 1.0 w %. In this embodiment, it is further understood in the examples below, the 'enhancement agents' includes but are not limited to Water-Insoluble Actives Disclosure and further optionally including cellulose and cellulose gum (Natpure® Cellgum Plus). The preferred levels are between about 0.01 wt % and 2.0 w %. In this embodiment, it is further understood in the examples below, the 'substrates' includes but are not limited to polyethylene film, cellulose based paper substrates (such as Bounty, printing paper, dissolving paper), cellulose based tissues (such as Charmin and Puffs), melamine foam (such as Mr. Clean magic eraser), thermoplastics (such as polyethylene, polypropylene, polyesters, polybutylene succinate, polyhydroxyalkanoates, polystyrene, polycarbonate, PVC, Nylon), thermosets (such as polyurethane, epoxy, silicones), wovens (such as cotton, polyester, spandex), nonwoven substrates comprising natural or synthetic fibers, polyolefins, starch, polyesters, and foils (such as aluminum foil).

An assembled product for floor cleaning may be prepared by placing a rheological solid composition between two substrates (FIG. 3). This assembled product is placed on the end of Swiffer-like mop head. When the consumer pushes the head across the surface with a consumer-relevant force—about 20 N, the rheological solid composition releases aqueous phase and any immobilized water insoluble-active. Such an assembled may be constructed with the following steps:

Step 1. 100 grams of water is added to a two-liter reaction vessel. Three grams of sodium palmitate (crystallizing agent) are added to the reaction vessel. The vessel is fitted with an overhead stirrer assembly, which is activated to create a modest vortex in the mixture. The mixture is heated to 80° C. until the all the crystallizing agent has completely dissolved, as event by a completely clear solution.

Step 2. (Samples AW-AX) Then, 0.2 grams of Mirapol 300, 0.4 grams amine oxide, 0.8 grams perfume, 4.9 grams of Dowanol PNB-TR, 2.0 grams of propylene glycol phenyl ether, 0.0025 grams of Kathon and optionally 1.0 g Natpure® Cellgum Plus are added the reaction vessel;

Alternatively, (Sample AY) 0.2 grams of Mirapol 300, 0.4 grams amine oxide, 1.5 grams perfume, 4.9 grams of Dowanol PNB-TR, 2.0 grams of propylene glycol phenyl ether, 2.0 grams DiPnB, 0.0025 grams of Kathon and optionally 1.0 g Natpure® Cellgum Plus are added the reaction vessel;

Alternatively, (Sample AZ) 0.2 grams of Mirapol 300, 0.4 grams amine oxide, 0.5 grams Bardac 2250, 1.5 grams perfume, 4.9 grams of Dowanol PNB-TR, 2.0 grams of propylene glycol phenyl ether, 2.0 grams DiPnB, 0.0025 grams of Kathon and optionally 1.0 g Natpure® Cellgum Plus are added the reaction vessel;

These compositions are mixed into the mixtures for at least 5 minutes.

Step 3. A substrate is selected and sectioned to about 10 cm×30 cm rectangle.

Then, separately, about 1 gram of the hot mixture in Step 2 is placed in a rubber mold with a rectangular section about 10 cm×30 cm. This mixture is cooled completely to about 25° C., forming a rheological solid composition. The composition is removed from the mold and placed centered on the substrate;

Alternatively, about 1 gram of the hot mixture in Step 2 is sprayed through a nozzle to create a fine mist which is deposited evenly on the substrate. The rheological solid composition is allowed to crystallize completely to about 25° C.;

Alternatively, about 1 gram of the hot mixture in Step 2 is slot coated evenly on to the substrate. The rheological solid composition is allowed to crystallize completely to about 25° C.;

Step 4. A second substrate is selected and sectioned to about 10 cm×30 cm rectangle. This substrate is placed centered on the substrate/rheological solid composition.

The assembled product can now be placed on the head of the mop, and used to clean the floors, as intended.

TABLE 14

| | Sample AW Inventive | Sample AX Inventive | Sample AY Inventive | Sample AZ Inventive |
|---|---|---|---|---|
| (1) Water | 100 g | 100 g | 100 g | 100 g |
| (4) NaC14 | — | 3.00 g | — | — |
| (5) NaC16 | 3.00 g | — | 3.00 g | 3.50 g |
| (6) NaC18 | — | — | — | 0.50 g |
| (19) Mirapol 300 | 0.020 g | 0.020 g | 0.020 g | 0.020 g |
| (20) Amine oxide | 0.040 g | 0.040 g | 0.040 g | 0.040 g |
| (28) Perfume | 0.080 g | 0.150 g | 0.150 g | 0.080 g |
| (23) Dowanol PNB-TR | 0.490 g | 0.490 g | 0.490 g | 0.490 g |
| (24) propylene glycol phenyl ether | 0.200 g | 0.200 g | 0.200 g | 0.200 g |
| (25) DiPnB | — | 0.200 g | 0.200 g | — |
| (22) Bardac 2250 | — | — | 0.053 g | — |
| (27) Kathon | 0.0025 g | 0.0025 g | 0.0025 g | 0.0025 g |
| (32) Natpure ® Cellgum Plus | 0.10 g | 0.10 g | — | 0.10 g |
| Substrate | Cotton | Cellulose | Starch | Foil |

Example 7

This non-limiting example shows suitable combination of two solid-water compositions used in combination with a substrate, flat support, and handle to create a floor-cleaning device. Each suitable solid-water composition was prepared by mixing ingredients heated until the mixture is a clear fluid, poured into a mold to cool and crystallized into a rheological solid with the dimensions of the mold. A core is assembled from two solid-water composition preparations, often where each has a different composition and may be either used directly from the mold or may be use after being cut into small sections before being assembled.

This core is placed between a top substrate and floor substrate to create a pad. Non-limiting examples of the pad include two solid-water preparations with such arrangements so that the two compositions sit side-by-side on the flat support (FIG. 4), the two compositions sit front-and-back on the flat support, and the two compositions sit one-on-top-of-the-other on the flat support (FIG. 5). The pad is affixed to the flat support and this combination is attached to a handle, to create a floor-cleaning device. The two-core pad configuration allow for different aqueous phase expression than inherent to each individual composition.

Preparation of Floor Treatment Pads and Devices

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

A suitable solid-water composition preparation is done by placing the stainless-steel beaker on the hot plate and heating the sample to 80° C., with constant stirring until the mixture results in a clear, low-viscosity fluid. Solution is then cooled for 10 minutes and poured into a pre-weighed mold (plastic) with dimensions of 260 mm (long)×98 mm (wide)×3 mm (thick). Once the mixture has solidified, the composition and mold are placed in a Mylar bag and into the refrigerator for 15 minutes. After this time, the composition and the mold are removed from the refrigerator, and a small spatula is run along the outside edges of the mold to separate the core from the mold, ensuring a smooth release of the solid-water composition core. The mold is carefully inverted to release the core, such that it remains as a single piece maintaining the shape of the mold. The final weight of the solid-water preparation is determined by subtracting the weight to the mold before and after the addition of the composition. In this example, the solid preparation is carefully cross-cut in half resulting two equal-sized sections of dimensions 130 mm×98 mm (rectangular sections). The process is repeated to create a suitable solid-water composition preparation.

Pads are created by assembling the solid-water core with one section from each preparation and with two substrate sheets (Table 15). The substrate sheets are PET sheets. The first substrate sheet—'floor' sheet, has the dimensions of 260 mm (long)×215 mm (wide), and is placed on a flat surface. One section from the first solid-water preparation (Sample BA) is placed on the floor sheet, such that it covers one end along the long direction of the floor sheet and centered on the width of the floor sheet. One section from the second solid-water preparation (Sample BB) is placed on the floor sheet, such that it covers the other end along the long direction of the floor sheet and centered on the width of the floor sheet. Once assembled, the two sections of each of the preparation are sitting side-by-side on the floor sheet, with no overlap or space between the sections, and with two wings of the floor sheet exposed. To complete the pad, the top sheet having the dimensions of 260 mm×100 mm and is placed directly on top to completely cover the core (Assembled; FIG. 4).

The devices were created by affixing the pad to the flat support and handle. The flat support of the dimensions of 255 mm×113 mm×18 mm is placed to completely cover the core and top sheet and done so gently to ensure no compression of and fluid release from the core. The wings on the floor sheet are folded over and affixed to the top of the flat support, holding the pad in place. A handle is affixed to the center of the flat support to allow the consumer to pass the pad over the floor with applied stress.

TABLE 15

| Individual Preparation | | |
|---|---|---|
| | Sample BA | Sample BB |
| (33) Fluid | 99.0% | 97.5% |
| (5) NaC16 | 1.0% | 3.0% |
| % Crystallizing Agent | 1.0% | 3.0% |
| Weight Core | 75 g | 75 g |
| Substrate | PET | PET |
| Assembled | | |
| Mass Prep. 1 | 32.5 g | |
| Mass Prep. 2 | 32.5 g | |

Preparation of Floor Treatment Pads and Devices

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

A suitable solid-water composition preparation was done by placing the stainless-steel beaker on the hot plate and heating the sample to 80° C., with constant stirring until the mixture results in a clear, low-viscosity fluid. Solution is then cooled for 10 minutes and poured into a pre-weighed mold (plastic) with dimensions of 260 mm (long)×98 mm (wide)×3 mm (thick). Once the mixture has solidified, the composition and mold are placed in a Mylar bag and into the refrigerator for 15 minutes. After this time, the composition and the mold are removed from the refrigerator, and a small spatula is run along the outside edges of the mold to separate the core from the mold, ensuring a smooth release of the solid-water composition core. The mold is carefully inverted to release the core, such that it remains as a single piece maintaining the shape of the mold. The final weight of the solid-water preparation is determined by subtracting the weight to the mold before and after the addition of the composition. In this example, the solid preparation is carefully rip-cut in half resulting two equal-sized sections of dimensions of 260 mm×49 mm (rectangular sections). The process is repeated to create a suitable solid-water composition preparation.

Pads are created by assembling the solid-water core with one section from each preparation and with two substrate sheets (Table 16). The substrate sheets are PET sheets. The first substrate sheet—'floor' sheet, has the dimensions of 260 mm (long)×215 mm (wide), and is placed on a flat surface. The floor sheet is 'virtual-quartered' into four non-overlapping sections, each 260 mm (long)×53.75 mm (wide). The two outside quarters are used for wings for the pad. One section from the first solid-water preparation (Sample BC) is placed on the floor sheet, completely covering on inside quarter of the floor sheet. One section from the second solid-water preparation (Sample BD) is placed on the floor sheet, completely covering the other inside quarter of the floor sheet. To complete the pad, the top sheet having the dimensions of 260 mm×100 mm and is placed directly on top to completely cover the two sections arranged in a front-and-back configuration (Assembled).

The devices are created by affixing the pad to the flat support and handle. The flat support of the dimensions of 255 mm×113 mm×18 mm is placed to completely cover the core and top sheet, and done so gently to ensure no compression of and fluid release from the solid-water core. The wings on the floor sheet are folded over and affixed to the top of the flat support, holding the pad in place. A handle is affixed to the center of the flat support to allow the consumer to pass the pad over the floor with applied stress.

TABLE 16

| Individual Preparation | | |
|---|---|---|
| | Sample BC | Sample BD |
| (33) Fluid | 99.0% | 97.5% |
| (5) NaC16 | 1.0% | 3.0% |
| % Crystallizing Agent | 1.0% | 3.0% |
| Weight Core | 75 g | 75 g |
| Substrate | PET | PET |
| Assembled | | |
| Mass Prep. 1 | 32.5 g | |
| Mass Prep. 2 | 32.5 g | |

Preparation of Floor Treatment Pads and Devices

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

A suitable solid-water composition preparation is done by placing the stainless-steel beaker on the hot plate and heating the sample to 80° C., with constant stirring until the mixture results in a clear, low-viscosity fluid. Solution is then cooled for 10 minutes and poured into a pre-weighed mold (plastic) with dimensions of 260 mm (long)×98 mm (wide)×3 mm (thick). Once the mixture has solidified, the composition and mold are placed in a Mylar bag and into the refrigerator for 15 minutes. After this time, the composition and the mold are removed from the refrigerator, and a small spatula is run along the outside edges of the mold to separate the core from the mold, ensuring a smooth release of the solid-water composition core. The mold is carefully inverted to release the core, such that it remains as a single piece maintaining the shape of the mold. The final weight of the solid-water preparation is determined by subtracting the weight to the mold before and after the addition of the composition. The process is repeated to create a suitable solid-water composition preparation.

Pads are created by assembling the solid-water core with from each preparation and with two substrate sheets (Table 17). The substrate sheets are PET sheets. The first substrate sheet—'floor' sheet, has the dimensions of 260 mm (long)×215 mm (wide), and is placed on a flat surface. The first solid-water preparation (Sample BE) is placed on the floor sheet with the long dimension parallel to the long dimension of the floor sheet and centered in the wide dimension, leaving two unexposed sections of the floor sheet as wings. The second solid-water preparation (Sample BF) is placed to completely cover the first preparation. This creates a 'stack' with two preparations, one preparation on top of the second preparation (Assembled).

The devices are created by affixing the pad to the flat support and handle. The flat support of the dimensions of 255 mm×113 mm×18 mm is placed to completely cover the core and top sheet, and done so gently to ensure no compression of and fluid release from the solid-water core. The wings on the floor sheet are folded over and affixed to the top of the flat support, holding the pad in place. A handle is affixed to the center of the flat support to allow the consumer to pass the pad over the floor with applied stress.

TABLE 17

| Individual Preparation | | |
|---|---|---|
| | Sample BE | Sample BF |
| (33) Fluid | 99.0% | 97.0% |
| (5) NaC16 | 1.0% | 3.0% |
| % Crystallizing Agent | 1.0% | 3.0% |
| Weight Core | 75 g | 75 g |
| Substrate | PET | PET |
| **Assembled** | | |
| Mass Prep. 1 | 32.5 g | |
| Mass Prep. 2 | 32.5 g | |

Example 8

This non-limiting example shows suitable combination of three solid-water compositions used in combination with a substrate, flat support, and handle to create a floor-cleaning device to clean floors. Each suitable solid-water composition is prepared—a preparation, by mixing ingredients heated until the mixture is a clear fluid, poured into a mold to cool and crystallized into a rheological solid with the dimensions of the mold. A core is assembled from three solid-water composition preparations, often where each has a different composition, two may have the same composition, and may be either used directly from the mold or may be use after being cut into small sections before being assembled.

This core was placed between a top and floor substrate sheets to create a pad. Non-limiting examples of the pad include two solid-water preparations with such arrangements so that there are two edge strips from a single preparation and a center with another preparation. The pad is affixed to the flat support and this combination is attached to a handle, to create a floor-cleaning device. The three-pad configuration allows—for example, for fluid flow rate reserves different than inherent to each individual composition, and segregation of actives and other ingredients, in the floor cleaning examples. The reserve fluid is employed through use of the fluid in the edges either through extended use at a single applied stress or through added compressive stress at some point through the cleaning process.

Preparation of Floor Treatment Pads and Devices

Compositions were prepared using a heated mixing device. An overhead mixer (IKA Works Inc, Wilmington, NC, model RW20 DMZ) and a three-blade impeller design was assembled. All preparations were heated on a heating-pad assembly (VWR, Radnor, PA, 7×7 CER Hotplate, cat. no. NO97042-690) where heating was controlled with an accompanying probe. All preparations were done in a 250 ml stainless steel beaker (Thermo Fischer Scientific, Waltham, MA).

A suitable solid-water composition preparation is done by placing the stainless-steel beaker on the hot plate and heating the sample to 80° C., with constant stirring until the mixture results in a clear, low-viscosity fluid. Solution is then cooled for 10 minutes and poured into a pre-weighed mold (plastic) with dimensions of 260 mm (long)×98 mm (wide)×6 mm (thick). Once the mixture has solidified, the composition and mold are placed in a Mylar bag and into the refrigerator for 15 minutes. After this time, the composition and the mold are removed from the refrigerator, and a small spatula is run along the outside edges of the mold to separate the core from the mold, ensuring a smooth release of the solid-water composition core. The mold is carefully inverted to release the core, such that it remains as a single piece maintaining the shape of the mold. The final weight of the solid-water preparation is determined by subtracting the weight to the mold before and after the addition of the composition. The process is repeated to create a second suitable solid-water composition.

Pads are created by assembling the solid-water core with from each preparation and with two substrate sheets (Table 18). The substrate sheets are PET sheets. The first substrate sheet—'floor' sheet, has the dimensions of 260 mm (long)×215 mm (wide), and is placed on a flat surface. The first solid-water preparation (Sample BG) is cut in half creating two sections with the dimensions of 260 mm×49.5 mm×3 mm (thick). This represents the 'center' section and is placed centered on the middle on the floor sheet. The second solid-water preparation (Sample BH) is cut into quarter strips of 260 mm×24.8 mm×6 mm (thick). These sections represent the 'edges' and are placed to either side of the slice of the previous preparation. To complete the pad, the top sheet having the dimensions of 260 mm×100 mm and is placed directly on top to completely cover the three sections (Assembled). This leaves two wings on either side of the combined core.

TABLE 18

| Individual Preparation | | |
|---|---|---|
| | Sample BG | Sample BH |
| (33) Fluid | 99.0% | 97.5% |
| (5) NaC16 | 1.0% | 2.5% |
| % Crystallizing Agent | 1.0% | 2.5% |
| Weight Core | 75.0 g | 150.0 grams |
| Substrate | PET | PET |
| **Assembled** | | |
| Mass Prep. 1 | 75.0 g | |
| Thickness (mm) | 6 mm | |
| Mass Prep. 2 | 37.5 g | |
| Thickness (mm) | 3 mm | |

Example 9

An assembled product may be used as hydration composition for paper towels.

Example 10

An assembled product may be used as hydration composition for toilet tissue. A first layer is coated with a silicone layer by spray coating to render it partially water impermeable on the surface. A rheological solid composition is prepared as described above. The rheological solid composition is then sprayed through a heated nozzle at a desired coating weight onto the toilet tissue and allowed to cool and solidify. An additional layer of PVOH is added, which has a silicone coating on one side. The PVOH is added on top of the rheological solid layer with the silicone side in contact with the rheological solid layer. A final layer or ply of toilet tissue is added as the exterior layer. Additional plies of toilet tissue may be present within the structure to add bulk or absorption capacity.

Example 11

Approximately 340 grams of Cleaning Composition A is added to a reaction vessel. Then, 8.75 grams of sodium stearate (crystallizing agent) are added to the reaction vessel. The vessel is fitted with an overhead stirrer assembly, which is activated to create a modest vortex in the mixture. The mixture submersed into a 90° C. hot water bath until the all the crystallizing agent has completely dissolved, as event by a completely clear solution. The hot mixture is placed in a rubber mold with a rectangular section about 10 cm×21 cm. This mixture is cooled completely to about 25° C., forming a rheological solid composition B. Then, the solid water composition is removed from the mold, weighed, and placed centered on a 14×22 cm piece of a substrate comprised of a 90 gsm co-form. One side which is the outermost layer is comprised of 8 gsm of Polypropylene scrim, with an inner layer that is comprised of 80 gsm of 80% pulp and 20% polypropylene and sealed with 2 g·m2 of polypropylene scrim that form a sandwich and is secured to a 15×14 cm glue sheet. Then, about 19 grams of cleaning composition A is evenly distributed on the assembled wet pad. A description of substrates is described in US 2017/0164808 A1.

TABLE 19

| Raw material | Cleaning composition A % wt. | A rheological solid composition B % wt. |
|---|---|---|
| (19) Mirapol HSC300 Agglomeration polymer | 0.02 | 0.02 |
| (20) Amine oxide | 0.01 | 0.01 |
| (23) Uniquat 2250 | 0.49 | 0.49 |
| (24) propylene glycol phenyl ether | 0.2 | 0.2 |
| (25) DiPnB | 0.2 | 0.2 |
| (26) DC1410 | 0.001 | 0.001 |
| (27) Kathon | 0.0003 | 0.0003 |
| (28) Perfume | 0.3 | 0.3 |
| (6) NaC18 | — | 2.5 |
| (1) Water | q.s. | q.s |

Controlling the release of cleaning composition A in assembled pads has the advantage of greater floor cleaning coverage for the consumer. In the following examples end result performance as measured by fluid release rate is determined by the difference in the initial weight of the pad compared to the final weight of the pad upon cleaning for any given floor area measured in square feet.

Example X is the assembled wet pad without a rheological solid composition

Example Y is the assembled wet pad with 55 grams of a rheological solid composition Example Z is the assembled wet pad with 85 grams of a rheological solid composition Impact of a rheological solid composition on floor coverage

TABLE 20

| | Fluid Release rate (g · m2) Area of the floor covered ($m^2$) | | | | |
|---|---|---|---|---|---|
| | 4.5 $m^2$ | 5.6 $m^2$ | 6.7 $m^2$ | 7.8 $m^2$ | 8.9 $m^2$ |
| Example X (comparative) | 8.7 | 4.3 | 2.1 | 0.0 | 0.0 |
| Example Y (inventive) | 7.6 | 6.5 | 6.5 | 4.3 | — |
| Example Z (inventive) | 13.0 | 13.0 | 13.0 | 9.8 | 8.9 |

Surprisingly, incorporation of 55 to 85 grams of solid water in an assembled pad leads to floor coverage beyond 5.6 m2 to 6.7 m2 floor area from a convention wet pad without solid-water In the following example end result performance, as measured by streaking and filming was measured using a using a glossmeter for solid water compositions of the present invention with nonionic emulsifiers such as PEG 8000 and Tween 20 and compared to solid water compositions without nonionic emulsifiers. Base measurements are taken and recorded before soiling of the tiles. The tiles are then soiled with a combination of lipid, water soluble, water insoluble and particulate soils according to table A.

TABLE 21

(Artificial Soil)

| Ingredient | % wt |
|---|---|
| Artificial body soil | 2.6 |
| Canola oil | 2.6 |
| Corn starch | 0.25 |
| Keratin Powder | 3.75 |
| Calcium Chloride | 11.25 |
| Sodium Chloride | 33.6 |
| Magnesium Chloride Hexahydrate | 3.75 |
| Ultrafine dust | 38.55 |
| ASHRAE | 1.92 |
| Cellulose | 1.4 |
| Grinded Calcium Chloride | 0.25 |
| Water, isopropyl alcohol | balance |

Thirty minutes after cleaning of tiles, log haze measurements are taken with gloss meter on the cleaned tiles and recoded. The log haze difference between the unsoiled tiles and the cleaning soiled tiles are illustrated in table 2.

TABLE 22

| Raw material | A rheological solid composition B % wt. | A rheological solid composition C % wt. |
|---|---|---|
| (19) Mirapol HSC300 | 0.02 | 0.02 |
| (20 Amine oxide | 0.01 | 0.01 |
| (23) Uniquat 2250 | 0.49 | 0.49 |
| (24) Propylene glycol phenyl ether | 0.2 | 0.2 |
| (25) DiPnB | 0.2 | 0.2 |
| (31) PEG 8000 | — | 0.03 |
| (29) Tween 20 | — | 0.01 |
| (23) Dowanol PNB-TR | 0.001 | 0.001 |
| (27) Kathon | 0.0003 | 0.0003 |
| (28) Perfume | 0.3 | 0.3 |
| (6) NaC18 | 2.5 | 2.5 |
| (1) Water | q.s. | q.s. |

Example X is the assembled wet pad without solid-water

Example Y is the assembled wet pad with 85 grams solid-water composition B

Example Z is the assembled wet pad with 85 grams solid-water composition C

TABLE 23

Haze measurements low number equals less streaking/filming

| | Delta log Haze (HU) | | | | | | | |
|---|---|---|---|---|---|---|---|---|
| Area (m2) | 1.1 | 2.2 | 3.3 | 4.5 | 5.6 | 6.7 | 7.8 | 8.9 |
| Example X comparative | 16 | 15 | 11 | 15 | 23 | 33 | N/A | N/A |
| Example Y inventive | 9.0 | 21 | 25 | 25 | 16 | 24 | 25 | 33 |
| Example Z inventive | 6.0 | 17 | 14 | 16 | 4.0 | 6.0 | 9.0 | 14 |

Incorporation of nonionic emulsifiers into solid water surprisingly leads to less hazing on tiles without significantly impacting floor coverage The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning article for cleaning a target surface, said cleaning article comprising:

a substrate having a first surface and second surface opposed thereto; and a rheological solid composition having a crystallizing agent and aqueous phase;

wherein the rheological solid composition has a firmness between about 0.1 N to about 50.0 N as determined by the FIRMNESS TEST METHOD;

a thermal stability of about 40° C. to about 95° C. as determined by the THERMAL STABILITY TEST METHOD;

a liquid expression of between about 100 J $m^{-3}$ to about 8,000 J $m^{-3}$ as determined by the AQUEOUS PHASE EXPRESSION TEST METHOD;

wherein the crystallizing agent is present in an amount from 1% to about 7% by weight of the rheological solid composition;

wherein the crystallizing agent has an Optimal Purity Po≥0.6 as determined by the BLEND TEST METHOD; and wherein the crystallizing agent is a salt of fatty acids containing from about 13 to about 20 carbon atoms.

2. The cleaning article of claim 1, wherein said crystallizing agent has an Optimal Purity Po as determined by the BLEND TEST METHOD greater than about 0.8.

3. The cleaning article of claim 1, wherein said crystallizing agent has a Single Purity Ps as determined by the BLEND TEST METHOD greater than about 0.5.

4. The cleaning article of claim 1, wherein said crystallizing agent has a Single Purity Ps as determined by the BLEND TEST METHOD greater than about 0.9.

5. The cleaning article of claim 1, wherein the crystallizing agent is a metal salt.

6. The cleaning article of claim 5, wherein the metal salt is a sodium salt.

7. The cleaning article of claim 6, wherein the sodium salt is at least one of sodium stearate, sodium palmitate, sodium myristate.

8. The cleaning article of claim 6, wherein the sodium salt is at least one of sodium tridecanoate, sodium pentadecanoate, sodium heptadecanoate and sodium nonadecanoate.

9. The cleaning article of claim 1, wherein the crystallizing agent is present in an amount from 1% to about 5% by weight of the rheological solid composition.

10. The cleaning article of claim 1, wherein the rheological solid composition comprises at least one nonionic emulsifier.

11. The cleaning article of claim 1, wherein the rheological solid composition comprises a polymer.

12. The cleaning article of claim 1, wherein the rheological solid composition comprises at least 90% water.

* * * * *